(12) United States Patent
Guan et al.

(10) Patent No.: US 10,225,062 B2
(45) Date of Patent: Mar. 5, 2019

(54) METHOD AND DEVICE FOR TRANSMITTING ACKNOWLEDGEMENT OR NEGATIVE ACKNOWLEDGEMENT INDICATION INFORMATION

(71) Applicant: Huawei Technologies Co., Ltd., Shenzhen (CN)

(72) Inventors: Lei Guan, Beijing (CN); Yongxia Lv, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/392,621

(22) Filed: Dec. 28, 2016

(65) Prior Publication Data
US 2017/0111156 A1    Apr. 20, 2017

Related U.S. Application Data

(63) Continuation of application No. 14/923,692, filed on Oct. 27, 2015, now Pat. No. 9,571,253, which is a (Continued)

(30) Foreign Application Priority Data

Apr. 21, 2011    (CN) .......................... 2011 1 0100737

(51) Int. Cl.
*H04B 7/00*    (2006.01)
*H04L 5/00*    (2006.01)
(Continued)

(52) U.S. Cl.
CPC .......... *H04L 5/0055* (2013.01); *H04L 1/1854* (2013.01); *H04L 1/1887* (2013.01);
(Continued)

(58) Field of Classification Search
CPC .... H04L 5/0055; H04L 1/1854; H04W 52/04; H04W 76/02; H04W 76/025; H04W 76/04
(Continued)

(56) References Cited

U.S. PATENT DOCUMENTS 8,830,939 B2    9/2014    Lunttila et al.
8,861,467 B2    10/2014    Ahn et al.
(Continued)

FOREIGN PATENT DOCUMENTS

CN    101651895 A    2/2010
CN    101754252 A    6/2010
(Continued)

OTHER PUBLICATIONS

"Draft 3GPP TS 36.213—3rd Generation Partnership Project; Technical Specification Group Radio Access Network; Evolved Universal Terrestrial Radio Access (E-UTRA); Physical layer procedures (Release 10)," Version a.1.0, 3rd Generation Partnership Project, Valbonne, France (Mar. 2011).
(Continued)

*Primary Examiner* — Dmitry Levitan
(74) *Attorney, Agent, or Firm* — Leydig, Voit & Mayer, Ltd.

(57) ABSTRACT

The present disclosure discloses a method and device for transmitting ACK/NACK indication information. A network-side device configures at least two carriers for a UE; transmits PDCCH information to the UE; selects one of at least two timing relationships as a first timing relationship; determines a corresponding third uplink subframe and first carrier; indicate related information corresponding to the third uplink subframe and the first carrier to the UE; in the third uplink subframe of the first carrier, determines a first channel resource, and indicates the first channel resource to
(Continued)

the UE; and receives an ACK/NACK fed back by the UE on the allocated resource.

14 Claims, 11 Drawing Sheets

Related U.S. Application Data continuation of application No. 14/054,031, filed on Oct. 15, 2013, now Pat. No. 9,203,587, which is a continuation of application No. PCT/CN2012/074523, filed on Apr. 23, 2012.

(51) Int. Cl.
*H04W 76/27* (2018.01)
*H04L 1/18* (2006.01)
*H04W 52/04* (2009.01)
*H04W 72/04* (2009.01)
*H04W 88/02* (2009.01)

(52) U.S. Cl.
CPC ......... *H04W 52/04* (2013.01); *H04W 72/042* (2013.01); *H04W 72/0413* (2013.01); *H04W 72/0446* (2013.01); *H04W 76/27* (2018.02); *H04W 88/02* (2013.01)

(58) Field of Classification Search
USPC .................. 370/310, 328, 329, 464, 465
See application file for complete search history.

(56) References Cited

U.S. PATENT DOCUMENTS

| | | | |
|---|---|---|---|
| 2011/0243066 A1* | 10/2011 | Nayeb Nazar | H04L 1/007 370/328 |
| 2011/0268048 A1 | 11/2011 | Toskala et al. | |
| 2011/0286414 A1 | 11/2011 | Qu et al. | |
| 2012/0213170 A1 | 8/2012 | Choi et al. | |
| 2013/0064190 A1 | 3/2013 | Hariharan et al. | |
| 2013/0215807 A1 | 8/2013 | Yang et al. | |
| 2013/0242799 A1 | 9/2013 | Yin et al. | |

FOREIGN PATENT DOCUMENTS

| | | |
|---|---|---|
| CN | 101795492 A | 8/2010 |
| EP | 2445132 A1 | 4/2012 |
| WO | 2010129619 A2 | 11/2010 |

OTHER PUBLICATIONS

"ACK/NACK feedback with channel selection for TDD," 3GPP TSG RAN WG1 Meeting #63, Jacksonville, Florida, Document R1-106152, 3rd Generation Partnership Project, Valbonne, France (Nov. 15-19, 2010).
"UE processing time in case of inter-band Carrier Aggregation," 3GPP TSG-RAN WG4 Meeting #57, Jacksonville, Florida, Document R4-104176, 3rd Generation Partnership Project, Valbonne, France (Nov. 15-19, 2010).
"Resource allocation for bundled A/N on PUCCH for TDD," 3GPP TSG-RAN WG1 Meeting #62bis, Xi'an, China, Document R1-105260, 3rd Generation Partnership Project, Valbonne, France (Oct. 11-15, 2010).
"PUCCH resource allocation for channel selection with Tx diversity," 3GPP TSG RAN WG1 Meeting #62bis, Xi'an, China, Document R1-105511, 3rd Generation Partnership Project, Valbonne, France (Oct. 11-15, 2010).
"Timing Relationship between Scell Activation/Deactivation and MAC CE," 3GPP TSG RAN WG2 Meeting #71, Madrid, Spain, Document R2-104419, 3rd Generation Partnership Project, Valbonne, France (Aug. 23-27, 2010).
"A/N for TDD with PUCCH Format 1b with channel selection," 3GPP TSG RAN WG1 Meeting #63bis, Dublin, Ireland, Document R1-110163, 3rd Generation Partnership Project, Valbonne, France (Jan. 17-21, 2011).
"Remaining Issues of ACK/NACK Feedback for LTE-A TDD," 3GPP TSG RAN WG1 Meeting #64, Taipei, Document R1-110821, 3rd Generation Partnership Project, Valbonne, France (Feb. 21-25, 2011).

* cited by examiner

METHOD AND DEVICE FOR TRANSMITTING ACKNOWLEDGEMENT OR NEGATIVE ACKNOWLEDGEMENT INDICATION INFORMATION

CROSS-REFERENCE TO RELATED APPLICATIONS

This application is a continuation of U.S. patent application Ser. No. 14/923,692, filed on Oct. 27, 2015, which is a continuation of U.S. patent application Ser. No. 14/054,031, filed on Oct. 15, 2013 (now U.S. Pat. No. 9,203,587), which is a continuation of International Patent Application No. PCT/CN2012/074523, filed on Apr. 23, 2012. The International Patent Application claims priority to Chinese Patent Application No. 201110100737.7, filed on Apr. 21, 2011. The afore-mentioned patent applications are hereby incorporated by reference in their entireties.

TECHNICAL FIELD

The present disclosure relates to the communications field, and in particular, to a method and device for transmitting acknowledgement or negative acknowledgement indication information.

BACKGROUND

In an LTE (long term evolution) TDD (time division duplex) or FDD (frequency division duplex) system, or a system where TDD and FDD carriers are aggregated, a base station may configure at least two carriers for a UE (user equipment), and transmit data to the UE through at least two carriers, where the configuration is referred to as carrier aggregation. The base station transmits PDCCH (physical downlink control channel) information to the UE in a downlink subframe, where the PDCCH information indicates scheduling information of a PDSCH (physical downlink shared channel) carried in the downlink subframe. The UE determines an uplink subframe according to a timing relationship between the subframe carrying the PDSCH and a subframe carrying an ACK (acknowledgement) or NACK (negative acknowledgement) corresponding to the PDSCH, and feeds back the ACK/NACK corresponding to the PDSCH in the uplink subframe of a primary carrier.

For carrier aggregation, after the base station transmits downlink data to the UE, the UE needs to feed back a corresponding ACK/NACK to the base station, where, if the UE feeds back an ACK, it indicates that data transmission is correct, or if the UE feeds back a NACK, the base station initiates corresponding retransmission.

However, the conventional ACK/NACK transmission method is applicable to only carrier aggregation of at least two TDD carriers with the same uplink and downlink subframe configurations, or carrier aggregation of at least two FDD carriers. When at least two TDD carriers of different uplink and downlink subframe configurations are aggregated, or at least one FDD carrier and at least one TDD carrier are aggregated, especially when a TDD carrier is used as a primary carrier, it is possible that an ACK/NACK cannot be fed back on the primary carrier, and no solution for feeding back the ACK/NACK is available at present.

SUMMARY

In order that an ACK/NACK may be fed back when carriers of different uplink and downlink subframe configurations are aggregated, the present disclosure provides a method and a device for transmitting acknowledgement or negative acknowledgement indication information.

The technical solution are as follows:

A method for transmitting acknowledgement or negative acknowledgement indication information includes:

configuring, by a network-side device, at least two carriers for a user equipment UE, where the carriers include one primary carrier and at least one secondary carrier;

transmitting, by the network-side device, PDCCH information to the UE in a first downlink subframe, where the PDCCH information indicates scheduling information of a PDSCH carried in a second downlink subframe;

selecting, by the network-side device, one of at least two timing relationships between the subframe carrying the PDSCH and a subframe carrying an ACK/NACK corresponding to the PDSCH, as a first timing relationship, where the first timing relationship meets a first condition, and the first condition is that on a first carrier corresponding to the first timing relationship, a subframe of the same time as the second downlink subframe is a downlink subframe; determining a third uplink subframe corresponding to the first timing relationship and used for the UE to transmit the ACK/NACK corresponding to the PDSCH; and determining the first carrier used for the UE to transmit the ACK/NACK corresponding to the PDSCH;

indicating, by the network-side device, related information corresponding to the determined third uplink subframe and the first carrier to the UE;

in the third uplink subframe of the first carrier, determining, by the network-side device, a first channel resource used for the UE to feed back the ACK/NACK corresponding to the PDSCH, and indicating the first channel resource to the UE; and receiving, by the network-side device, the ACK/NACK fed back by the UE on the first channel resource in the third subframe of the first carrier.

Another method for transmitting acknowledgement or negative acknowledgement indication information includes:

determining, by a UE, two carriers configured by a network-side device for the UE, where the carriers include one primary carrier and at least one secondary carrier;

receiving, by the UE, PDCCH information transmitted by the network-side device in a first downlink subframe, where the PDCCH information indicates scheduling information of a PDSCH carried in a second downlink subframe;

obtaining, by the UE, indication information transmitted by the network-side device, and determining, according to the indication information, a third uplink subframe and a first carrier that are determined by the network-side device for the UE and used for ACK/NACK feedback, where a first timing relationship corresponding to the indication information meets a first condition: on a first carrier corresponding to the first timing relationship, a subframe of the same time as the second downlink subframe is a downlink subframe;

obtaining, by the UE, a first channel resource allocated by the network-side device for the UE and used for feeding back an ACK/NACK corresponding to the PDSCH; and transmitting, by the UE, the ACK/NACK corresponding to the PDSCH on the first channel resource in the third uplink subframe of the first carrier.

The present disclosure also provides a network-side device, where the network-side device includes a transmitting unit, a receiving unit, and a processing unit, where:

the transmitting unit is configured to notify a UE of carriers configured by the processing unit; transmit PDCCH information to the UE in a first subframe, where the PDCCH information is used to indicate scheduling information of a PDSCH carried in a second downlink subframe; and indicate, to the UE, related information corresponding to a third uplink subframe and a first carrier that are determined by the processing unit and a first channel resource determined by the processing unit;

the processing unit is configured to configure at least two carriers for the UE, where the carriers include one primary carrier and at least one secondary carrier; select one of at least two timing relationships between the subframe carrying the PDSCH and a subframe carrying an ACK/NACK corresponding to the PDSCH, as a first timing relationship, where the first timing relationship meets a first condition, and the first condition is that on a first carrier corresponding to the first timing relationship, a subframe of the same time as the second downlink subframe is a downlink subframe; determine a third uplink subframe corresponding to the first timing relationship and used for the UE to transmit the ACK/NACK corresponding to the PDSCH; determine the first carrier used for the UE to transmit the ACK/NACK corresponding to the PDSCH; and in the determined third uplink subframe of the first carrier, determine a first channel resource used for the UE to feed back the ACK/NACK corresponding to the PDSCH; and the receiving unit is configured to receive the ACK/NACK fed back by the UE on the first channel resource in the third subframe of the first carrier.

The present disclosure also provides a user equipment, including: a receiving unit, a processing unit, and a transmitting unit, where:

the receiving unit is configured to receive information about two carriers allocated by a network-side device for the user equipment UE, where the carriers include one primary carrier and at least one secondary carrier; receive PDCCH information transmitted by the network-side device to the UE in a first downlink subframe, where the PDCCH information indicates scheduling information of a PDSCH carried in a second downlink subframe; receive indication information transmitted by the network-side device, where a first timing relationship corresponding to the indication information meets a first condition: on a first carrier corresponding to the timing relationship, a subframe of the same time as the second downlink subframe is a downlink subframe; and receive information about a first channel resource allocated by the network-side device for the UE and used for feeding back an ACK/NACK corresponding to the PDSCH;

the processing unit is configured to determine, according to the indication information received by the receiving unit, a third uplink subframe and a first carrier that are determined by the network-side device for the UE and used for ACK/NACK feedback; and determine, according to the information about the first channel resource received by the receiving unit, to transmit the ACK/NACK corresponding to the PDSCH on the first channel resource in the third uplink subframe of the first carrier; and the transmitting unit is configured to transmit the ACK/NACK corresponding to the PDSCH on the first channel resource in the third uplink subframe of the first carrier.

The technical solutions provided by the present disclosure bring the following benefits:

By using the above implementation solutions, in a system where at least two TDD carriers of different uplink and downlink subframe configurations are aggregated or a system where at least one FDD carrier and at least one TDD carrier are aggregated, a network-side device selects a first timing relationship from at least two timing relationships, and on a first carrier corresponding to the first timing relationship, a subframe of the same time as the second downlink subframe is a downlink subframe, thereby configuring a subframe, a carrier, and a corresponding channel resource that may be used for ACK/NACK feedback for the UE. Therefore, it can be guaranteed that the UE not only can perform ACKK/NACK feedback, but also can perform flexible ACK/NACK feedback. In addition, the solutions of the present disclosure are also applicable to a system where at least two TDD carriers of the same uplink and downlink subframe configurations are aggregated, or a system where at least two FDD carriers are aggregated, or similar systems.

In addition, the above implementation solutions make it possible to choose to feed back the ACK/NACK in different carriers or different subframes of a same carrier. Therefore, the solutions may also balance ACK/NACK feedback loads on all carriers or all subframes.

BRIEF DESCRIPTION OF DRAWINGS

To illustrate the technical solutions in the embodiments of the present disclosure more clearly, the following briefly introduces the accompanying drawings needed for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure more comprehensible, the following further describes the embodiments of the present disclosure in detail with reference to the accompanying drawings.

Embodiment 1

Figure 1:
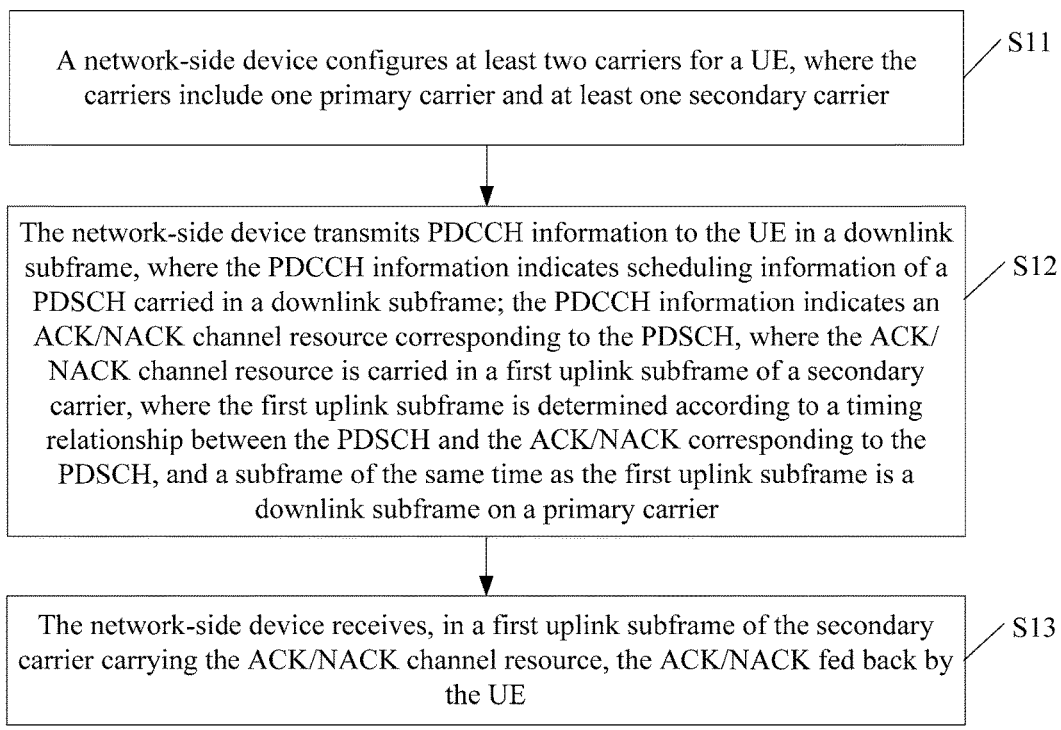
FIG. 1 is a flowchart of a method for transmitting acknowledgement or negative acknowledgement indication information in a TDD system according to Embodiment 1 of the present disclosure.

This embodiment provides a method for transmitting acknowledgement or negative acknowledgement indication information in a TDD system. As shown in FIG. 1, this method may be executed by a network-side device, and specifically includes:

S11. A network-side device configures at least two carriers for a UE, where the carriers include one primary carrier and at least one secondary carrier.

S12. The network-side device transmits PDCCH information to the UE in a downlink subframe, where the PDCCH information indicates scheduling information of a PDSCH carried in a downlink subframe; the PDCCH information indicates an ACK/NACK channel resource corresponding to the PDSCH, where the ACK/NACK channel resource is carried in a first uplink subframe of a secondary carrier, where the first uplink subframe is determined according to a timing relationship between the PDSCH and the ACK/NACK corresponding to the PDSCH, and a subframe of the same time as the first uplink subframe is a downlink subframe on a primary carrier.

The ACK/NACK resource is an ACK/NACK resource of a PUCCH format (format) 3, or the ACK/NACK resource is a group of ACK/NACK resources of a PUCCH format 1b. The number of resources in a group of ACK/NACK resources of the PUCCH format 1b may be 2, 3, or 4.

In addition, the network-side device may be specifically a base station, which is the same for the subsequent embodiments.

S13. The network-side device receives, in a first uplink subframe of the secondary carrier carrying the ACK/NACK channel resource, the ACK/NACK fed back by the UE.

Figures 2, 3:
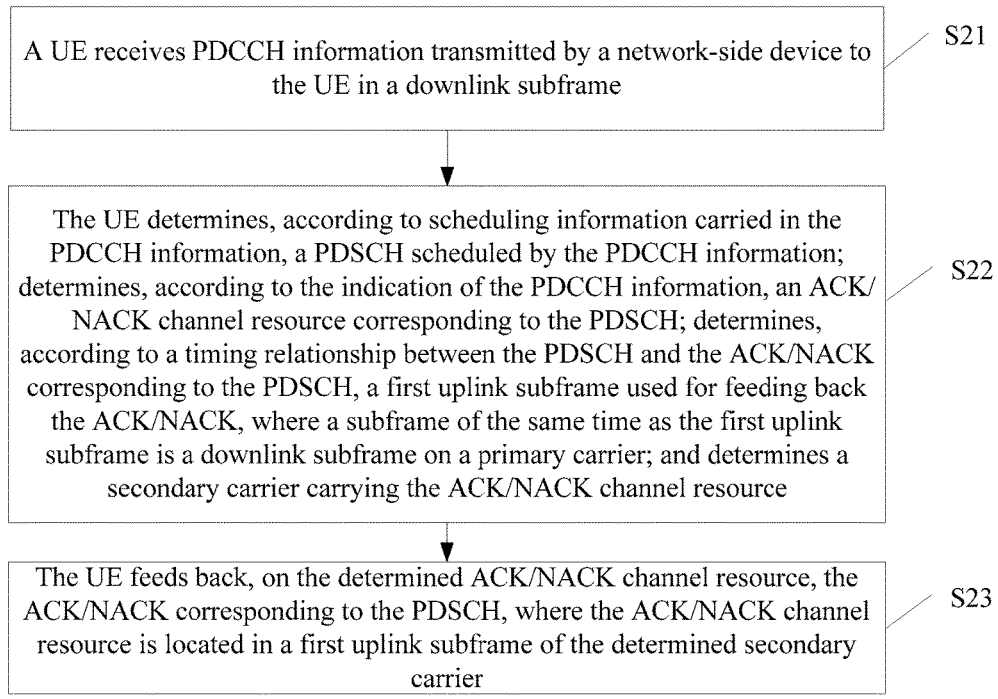
FIG. 2 is a flowchart of a method for transmitting acknowledgement or negative acknowledgement indication information in a TDD system according to Embodiment 1 of the present disclosure.
FIG. 3 is a schematic diagram of uplink and downlink subframe configurations and timing relationships in carrier aggregation according to Embodiment 1 of the present disclosure.

The method for transmitting acknowledgement or negative acknowledgement indication information in a TDD system according to this embodiment may be as shown in FIG. 2; the method may also be executed by a UE, and specifically includes:

S21. A UE receives PDCCH information transmitted by a network-side device to the UE in a downlink subframe.

S22. The UE determines, according to scheduling information carried in the PDCCH information, a PDSCH scheduled by the PDCCH information; determines, according to the indication of the PDCCH information, an ACK/NACK channel resource corresponding to the PDSCH; determines, according to a timing relationship between the PDSCH and the ACK/NACK corresponding to the PDSCH, a first uplink subframe used for feeding back the ACK/NACK, where a subframe of the same time as the first uplink subframe is a downlink subframe on a primary carrier; and determines a secondary carrier carrying the ACK/NACK channel resource.

S23. The UE feeds back, on the determined ACK/NACK channel resource, the ACK/NACK corresponding to the PDSCH, where the ACK/NACK channel resource is located in a first uplink subframe of the determined secondary carrier.

In the embodiment of the present disclosure, a primary carrier may also be called a primary cell (Pcell), and a secondary carrier may also be called a secondary cell (Scell).

Using FIG. 3 as an example to describe the above method, it is assumed that a CC (component carrier) of configuration 1 is a primary carrier and that a CC of configuration 2 is a secondary carrier. According to the rule in the prior art that the ACK/NACK can be fed back only on the primary carrier, because subframe 7 of the secondary carrier is an uplink subframe, and subframe 7 of the primary carrier is a downlink subframe, four ACKs/NACKs in subframe 7 cannot be fed back on the primary carrier. According to the method of this embodiment, four ACKs/NACKs in subframe 7 may be fed back on the secondary carrier. The ACKs/NACKs in subframe 3 and subframe 4 are fed back on the primary carrier. The ACKs/NACKs in subframe 2 may be fed back not only on the primary carrier but also on the secondary carrier.

A subframe of the same time as the first uplink subframe is an uplink subframe on the first secondary carrier; if there is one secondary carrier, the ACK/NACK channel resource is carried in a first uplink subframe of the first secondary carrier; and/or, if there are two or more first secondary carriers, the ACK/NACK channel resource is carried in a first uplink subframe of one secondary carrier among the first secondary carriers, where the one secondary carrier among the first secondary carriers is one of the following secondary carriers: a secondary carrier of the highest priority, a secondary carrier of the lightest load, a secondary carrier of the lowest or highest frequency, and a secondary carrier of the minimum or maximum index value. The network-side device may configure a secondary carrier for the UE through signaling.

In the case that the network-side device configures a secondary carrier through signaling, specifically, the network-side device may determine, according to loads of ACK/NACK resources on different carriers and so on, a secondary carrier for the UE to feed back the ACK/NACK, and configures the determined secondary carrier for the UE through RRC signaling or physical-layer signaling (such as PDCCH). More generally, for carrier aggregation of different bands, the network-side device may configure a secondary carrier on each band for the UE to feed back the ACK/NACK, or the network-side device configures a secondary carrier for the UE on every band except the band of the primary carrier of the UE, where the secondary carrier is used for the UE to feed back the ACK/NACK. At the time of feeding back the ACK/NACK, when a subframe corresponding to the time on the carrier of only one band is an uplink subframe, but subframes corresponding to the time on carriers of other bands are all downlink subframes, the ACK/NACK is fed back on a secondary carrier configured on a band where the subframe at the time is an uplink subframe; at the time of feeding back the ACK/NACK, when subframes corresponding to the time on the carriers of two or more bands are uplink subframes, the ACK/NACK is fed back on a secondary carrier configured on a band (for example, predetermined by a standard, for example, a band of a low frequency, or a band of which the network side notifies the UE through signaling, or a band of the highest priority selected according to priorities of bands) where the subframe at the time is an uplink subframe, or the ACK/NACK is fed back on a specific secondary carrier (such as a configured secondary carrier of the highest priority) among secondary carriers where the subframes at the time are uplink subframes, or the ACK/NACK is fed back on a secondary carrier configured on at least two bands where the subframes at the time are uplink subframes.

If there are two or more first secondary carriers, and the ACK/NACK channel resource is carried in the first uplink subframe of the secondary carrier of the highest priority among the first secondary carriers, the method further includes:

determining the priority of each secondary carrier among the first secondary carriers according to the load of the ACK/NACK corresponding to the first uplink subframe on each secondary carrier where the first uplink subframe is an uplink subframe, or the frequency of each secondary carrier, or the index configuration of each secondary carrier;

or determining priorities for secondary carriers configured for the UE, which specifically includes: for each time, determining priorities for all secondary carriers where a subframe corresponding to the time is an uplink subframe, and determining priorities of secondary carriers among the first secondary carriers, which specifically includes: obtaining priorities of all secondary carriers where a subframe corresponding to the time of the first uplink subframe is an uplink frame.

Preferably, the determining the priorities for the secondary carriers configured for the UE may be: if a subframe at the time on the primary carrier is an uplink subframe, the priority of the primary carrier may be set to the highest. In addition, the priority may be predefined according to some information, for example, the priority is set according to a carrier identifier. In this case, both the network-side device and the UE may determine the priority of the carrier. The priority may also be set by the network-side device, and then configured for the UE through signaling, where the signaling may be RRC (radio resource control) dedicated signaling, or PDCCH information. If the network-side device configures a priority for the UE through PDCCH information, the network-side device may implicitly determine the priority through a bit, scrambling code, or some existing fields in the PDCCH, for example, use a resource allocation field in downlink scheduling in the PDCCH, and determine the priority according to the number of allocated resources indicated by the resource allocation field, for example, set the highest priority for the carrier that has the most allocated resources. For example, subframe 3 is a downlink subframe for the primary carrier, and subframe 3 is an uplink subframe for two secondary carriers. Therefore, for subframe 3, priorities may be set for two secondary carriers; if the number of allocated resources in subframe 3 on secondary carrier 1 is greater than that on secondary carrier 2, the priorities of carriers for subframe 3 may be set as follows: the priority of secondary carrier 1 is higher than that of secondary carrier 2.

After the network-side device determines that the ACK/NACK channel resource corresponding to the PDSCH is located on the secondary carrier, the network-side device may further transmit information about the determined secondary carrier to the UE through PDCCH information.

When the network-side device schedules only one secondary carrier for the UE and does not schedule a primary carrier, the secondary carrier is a second secondary carrier. Correspondingly, when the network-side device transmits a piece of PDCCH information to the UE, the ACK/NACK channel resource is carried in a first uplink subframe on the second secondary carrier.

The identifier of a control channel element CCE occupied by the PDCCH corresponds to the ACK/NACK channel resource; the PDCCH information indicates scheduling information of a physical downlink shared channel PDSCH carried by the downlink subframe, including: indicating the ACK/NACK channel resource by using the identifier of a CCE among the CCEs occupied by the PDDCH. The method is referred to as an implicit indicating method, and is applicable to the case that the network-side device schedules only one secondary carrier for the UE and does not schedule a primary carrier.

The method further includes: reserving, by the network-side device, an ACK/NACK resource set for the UE in a subframe used for ACK/NACK feedback, where at least one ACK/NACK channel resource included in the ACK/NACK resource set is located on one or multiple secondary carriers, and each ACK/NACK channel resource in the ACK/NACK resource set is carried on a unique secondary carrier; the indicating, by the PDCCH information, the ACK/NACK channel resource corresponding to the PDSCH, includes: using, by the network-side device, the TPC (transmit power control) or DAI (downlink assignment index) in the PDCCH information transmitted to the UE as an ARI (ACK/NACK channel resource indicator), where the ARI is used to indicate an ACK/NACK channel resource used for the UE to feed back the ACK/NACK, and the carrier carrying the ACK/NACK channel resource is a carrier used for the UE to feed back the ACK/NACK. The method is referred to as an explicit indicating method, and is applicable to the case that multiple carriers are scheduled in a downlink subframe.

Correspondingly, the UE receives the RRC dedicated signaling transmitted by the network-side device, and obtains, according to the RRC dedicated signaling, an ACK/NACK resource set that is reserved by the network-side device for the UE in a subframe used for ACK/NACK feedback, where at least one ACK/NACK channel resource included in the ACK/NACK resource set is located on one or multiple secondary carriers, and each ACK/NACK channel resource in the ACK/NACK resource set is carried on a unique secondary carrier.

In step S22, the determining, according to scheduling information, an ACK/NACK channel resource corresponding to the PDSCH, includes:

obtaining, by the UE, the TPC or DAI that is included in the PDCCH information transmitted by the network-side device and is used as an ACK/NACK channel resource indicator ARI, and determining, according to the ARI, an ACK/NACK channel resource that is included in the ACK/NACK resource set and is used for the UE to feed back the ACK/NACK, where the carrier carrying the ACK/NACK channel resource is a carrier used for the UE to feed back the ACK/NACK.

The obtaining, by the UE, the TPC or DAI that is used as an ACK/NACK channel resource indicator ARI, includes:

selecting, by the UE, one of the secondary carriers where the first uplink subframe corresponds to an uplink subframe, as a third secondary carrier; using a TPC command word in the PDCCH information corresponding to the PDSCH carried on the third secondary carrier as a TPC command word; using a TPC command word in the PDCCH information corresponding to other PDSCHs as an ARI, where the other PDSCHs are carried on one or multiple secondary carriers among other secondary carriers than the third secondary carrier, and ARI values are the same when the other PDSCHs are carried on multiple secondary carriers.

Using FIG. 3 as an example, the ACK/NACK in subframe 2 is for downlink scheduling of two CCs, namely, a primary carrier and a secondary carrier. Therefore, the ARI may dynamically indicate that the ACK/NACK is fed back on the primary carrier or secondary carrier. Thereby, ACK/NACK loads on multiple CCs may be adjusted dynamically, so that ACK/NACK loads are balanced. The ACK/NACK in subframes 3, 4, and 7 is only for downlink scheduling of one CC, and each CC may feed back the ACK/NACK. Therefore, the network-side device may use the ACK/NACK resource corresponding to the PDCCH implicit indication. Compared with the conventional mechanism where scheduling of the primary carrier uses the ACK/NACK resource corresponding to the PDCCH implicit indication, scheduling of the secondary carrier needs to use the ACK/NACK resource corresponding to the ARI explicit indication. In this embodiment, for downlink scheduling of one CC, scheduling of only one secondary carrier may also use the ACK/NACK resource corresponding to the PDCCH implicit indication, thereby saving signaling resource overheads.

The using, by the network-side device, the TPC in the PDCCH information as an ARI, includes: selecting, by the network-side device, one of the secondary carriers where the first uplink subframe corresponds to an uplink subframe, as a third secondary carrier, where the third secondary carrier is a secondary carrier of the highest priority among the secondary carriers where the first uplink subframe corresponds to an uplink subframe; scheduling a TPC command word in the PDCCH information corresponding to the PDSCH carried on the third secondary carrier as a TPC command word; and scheduling a TPC command word in the PDCCH information corresponding to other PDSCHs as an ARI, where the other PDSCHs are carried on one or multiple secondary carriers among other secondary carriers than the third secondary carrier, and ARI values are the same when the other PDSCHs are carried on multiple secondary carriers.

Further, if the PDCCH is a PDCCH that schedules at least two carriers except the carrier of the highest priority, at least two ARIs in the PDCCH may indicate, based on a same or different ACK/NACK resource sets, that the ACK/NACK resource is located on a carrier of at least two carriers.

Specifically, the ARI in the PDCCH may indicate, based on a same ACK/NACK resource set, the ACK/NACK resource, for example, ARI1 in the PDCCH scheduling secondary carrier 1 and ARI1 in the PDCCH scheduling secondary carrier 2, to indicate the ACK/NACK resource in an ACK/NACK resource set, thereby saving overheads reserved for the ACK/NACK resource.

The ARI in the PDCCH may also be an indication based on different ACK/NACK resource sets. In this embodiment, a priority may be set for each carrier, and the carrier of the highest priority is set to the first carrier, and other carriers are second carriers.

For example, it is assumed that: three carriers Pcell, Scell1, and Scell2 are configured for the UE; subframe n is an uplink subframe for all the three carriers; priorities are set as follows: The priority of the Pcell is higher than the priority of Scell1 and higher than the priority of Scell2, where subframe n is used to feed back the ACK/NACK corresponding to the PDSCH scheduled in subframe p, and subframe p is an downlink subframe for all the three carriers. If the network-side device schedules the three carriers for the UE in downlink subframe p, the UE feeds back, on the resource indicated by ARI1 in PDCCH1 that schedules Scell1, three ACKs/NACKs corresponding to downlink subframe p of the three carriers; if the UE leaves PDCCH1 undetected, the UE feeds back, on the resource indicated by the ARI2 in the PDCCH2 that schedules Scell2, two ACKs/NACKs corresponding to downlink subframe p of the Pcell and Scell2. The network-side device learns, through blind detection for the ACK/NACK resource indicated by ARI1 and ARI2, that the UE leaves PDCCH1 undetected and detects only two pieces of ACK/NACK information on the ACK/NACK resource. Because the network-side device considers that the UE does not receive the PDCCH1 and considers that the UE may not feed back the ACK/NACK corresponding to the PDCCH1, the ACK/NACK detection performance is improved due to decrease of the detected ACK/NACK bits. If the network-side device schedules only the Pcell and Scell2 for the UE in downlink subframe p, the UE feeds back two ACK/NACK resources corresponding to downlink subframe p of the Pcell and Scell2 on the resource indicated by ARI2 of the PDCCH2 that schedules Scell2, and the network-side device detects, directly on the ACK/NACK resource indicated by ARI2, only the two pieces of ACK/NACK information corresponding to the Pcell and Scell2, thereby improving detection performance. If the network-side device schedules only the Pcell and Scell1 for the UE in downlink subframe p, the UE feeds back, on the resource indicated by ARI1 of the PDCCH1 that schedules Scell1, three ACK/NACK resources corresponding to downlink subframe p of the Pcell, Scell1, and Scell2, and the network-side device detects, directly on the ACK/NACK resource indicated by ARI1, the two pieces of ACK/NACK information corresponding to the Pcell and Scell1. Therefore, in this case, the UE is unable to learn whether it is that the network-side device schedules Scell2 whereas the UE leaves PDCCH2 undetected, or it is that the network-side device does not schedule Scell2 at all.

The method further includes: determining priorities for secondary carriers configured for the UE, where the determining includes: for each time, determining priorities for all secondary carriers where a subframe corresponding to the time is an uplink subframe.

The determining priorities for all secondary carriers where a subframe corresponding to the time is an uplink subframe includes: according to the load of the ACK/NACK on each secondary carrier where the subframe is an uplink subframe, or the frequency of each secondary carrier, or the index configuration of each secondary carrier.

In this embodiment, the network-side device indicates, through PDCCH information, that the ACK/NACK channel resource corresponding to the PDSCH is carried in the first uplink subframe on the secondary carrier and that a subframe of the same time as the first uplink subframe is a downlink subframe on the primary carrier, so that the UE feeds back, on the ACK/NACK channel resource in the first uplink subframe of the determined secondary carrier, the ACK/NACK corresponding to the PDSCH, so that the ACK/NACK can also be fed back when carriers of different uplink and downlink subframe configurations are aggregated.

For Embodiment 1, in brief, for the method for receiving acknowledgement or negative indication information in the time-division duplex TDD system, the specific implementation on the network-side device may include:

configuring, by a network-side device, at least two carriers for a user equipment UE, where the carriers include one primary carrier and at least one secondary carrier;

transmitting, by the network-side device, physical downlink control channel PDCCH information to the UE in a downlink subframe, where the PDCCH information indicates scheduling information of a physical downlink shared channel PDSCH carried in a downlink subframe; the PDCCH information indicates an acknowledgement ACK or negative acknowledgement NACK channel resource corresponding to the PDSCH, where the ACK/NACK channel resource is carried in a first uplink subframe of a secondary carrier, where the first uplink subframe is determined according to a timing relationship between the PDSCH and the ACK/NACK corresponding to the PDSCH, and a subframe of the same time as the first uplink subframe is a downlink subframe on the primary carrier; and receiving, by the network-side device, in the first uplink subframe of the secondary carrier carrying the ACK/NACK channel resource, the ACK/NACK fed back by the UE.

A subframe of the same time as the first uplink subframe is an uplink subframe on the first secondary carrier.

If there is one first secondary carrier, the ACK/NACK channel resource is carried in the first uplink subframe of the first secondary carrier;

and/or, if there are two or more first secondary carriers, the ACK/NACK channel resource is carried in the first uplink subframe of one secondary carrier among the first secondary carriers.

The one secondary carrier among the first secondary carriers is one of the following secondary carriers:

a secondary carrier of the highest priority, a secondary carrier of the lightest load, a secondary carrier of the lowest frequency, a secondary carrier of the minimum index value, and a secondary carrier configured by the network-side device for the UE through signaling.

If there are two or more first secondary carriers, and the ACK/NACK channel resource is carried in the first uplink subframe of one secondary carrier among the first secondary carriers, the method further includes:

determining priorities of secondary carriers among the first secondary carriers according to the load of the ACK/NACK corresponding to the first uplink subframe on each secondary carrier where the first uplink subframe is an uplink subframe, or the frequency of each secondary carrier, or the index configuration of each secondary carrier;

or, the method further includes:

determining priorities for secondary carriers configured for the UE, where the determining includes: for each time, determining priorities for all secondary carriers where a subframe corresponding to the time is an uplink subframe; and determining priorities of secondary carriers among the first secondary carriers, where the determining specifically includes: obtaining priorities of all secondary carriers where a subframe corresponding to the time of the first uplink subframe is an uplink subframe.

After the network-side device determines that the ACK/NACK channel resource corresponding to the PDSCH is located on the secondary carrier, the method further includes:

sending information about the determined secondary carrier to the UE through the PDCCH information.

When the network-side device schedules only one secondary carrier for the UE and does not schedule a primary carrier, the secondary carrier is a second secondary carrier. Correspondingly, when the network-side device transmits a piece of PDCCH information to the UE, the ACK/NACK channel resource is carried in a first uplink subframe on the second secondary carrier.

Correspondingly, the identifier of the control channel element CCE occupied by the PDCCH corresponds to the ACK/NACK channel resource;

the indicating, by the PDCCH information, scheduling information of a physical downlink shared channel PDSCH that is carried by the downlink subframe, includes:

indicating the ACK/NACK channel resource by using the identifier of a CCE among the CCEs occupied by the PDCCH.

The method further includes: reserving, by the network-side device through radio resource control RRC dedicated signaling, an ACK/NACK resource set for the UE in a subframe used for ACK/NACK feedback, where at least one ACK/NACK channel resource included in the ACK/NACK resource set is located on one or multiple secondary carriers, and each ACK/NACK channel resource in the ACK/NACK resource set is carried on a unique secondary carrier;

the indicating, by the PDCCH information, the ACK/NACK channel resource corresponding to the PDSCH, includes:

using, by the network-side device, the transmit power control TPC or downlink assignment index DAI in the PDCCH information transmitted to the UE as an ACK/NACK channel resource indicator ARI, where the ARI is used to indicate an ACK/NACK channel resource that is included in the ACK/NACK resource set and used for the UE to feed back the ACK/NACK, and the carrier carrying the ACK/NACK channel resource is a carrier used for the UE to feed back the ACK/NACK.

Correspondingly, the using, by the network-side device, the TPC in the PDCCH information as an ARI, includes:

selecting, by the network-side device, one of the secondary carriers where the first uplink subframe corresponds to an uplink subframe, as a third secondary carrier;

scheduling a TPC command word in the PDCCH information corresponding to the PDSCH carried on the third carrier as a TPC command word;

scheduling a TPC command word in the PDCCH information corresponding to other PDSCHs as an ARI, where the other PDSCHs are carried on one or multiple secondary carriers among other secondary carriers than the third secondary carrier, and the ARI values are the same when the other PDSCHs are carried on multiple secondary carriers.

Correspondingly, the method further includes:

determining priorities for secondary carriers configured for the UE, where the determining includes: for each time, determining priorities for all secondary carriers where a subframe corresponding to the time is an uplink subframe;

the third secondary carrier is a secondary carrier of the highest priority among the secondary carriers where the first uplink subframe corresponds to an uplink subframe.

Correspondingly, the determining priorities for all secondary carriers where a subframe corresponding to the time is an uplink subframe includes:

according to the load of the ACK/NACK on each secondary carrier where the subframe is an uplink subframe, or the frequency of each secondary carrier, or the index configuration of each secondary carrier.

For the method for transmitting acknowledgement or negative acknowledgement indication information in the time-division duplex TDD system according to this embodiment, the specific implementation on the UE side may include:

receiving, by a user equipment UE, physical downlink control channel PDCCH information transmitted by a network-side device to the UE in a downlink subframe;

determining, by the UE according to scheduling information carried in the PDCCH information, a physical downlink shared channel PDSCH scheduled by the PDCCH information; determining, according to the PDCCH information, an acknowledgement ACK or negative acknowledgement NACK channel resource corresponding to the PDSCH; determining, according to a timing relationship between the PDSCH and the ACK/NACK corresponding to the PDSCH, a first uplink subframe used for feeding back the ACK/NACK, where a subframe of the same time as the first uplink subframe is a downlink subframe on a primary carrier; and determining a secondary carrier carrying the ACK/NACK channel resource;

feeding back, by the UE on the determined ACK/NACK channel resource, the ACK/NACK corresponding to the PDSCH, where the ACK/NACK channel resource is located in the first uplink subframe of the determined secondary carrier.

The method further includes: receiving, by the UE, radio resource control RRC dedicated signaling transmitted by the network-side device, and obtaining, according to the RRC dedicated signaling, an ACK/NACK resource set that is reserved by the network-side device for the UE in a subframe used for ACK/NACK feedback, where at least one ACK/NACK channel resource included in the ACK/NACK resource set is located on one or multiple secondary carriers, and each ACK/NACK channel resource in the ACK/NACK resource set is carried on a unique secondary carrier;

the determining, according to the PDCCH information, the ACK/NACK channel resource corresponding to the PDSCH, includes:

obtaining, by the UE, the transmit power control TPC or downlink assignment index DAI that is included in the PDCCH information transmitted by the network-side device and is used as an ACK/NACK channel resource indicator ARI, and determining, in the ACK/NACK resource set according to the ARI, the ACK/NACK channel resource used for the UE to feed back the ACK/NACK, where the carrier carrying the ACK/NACK channel resource is a carrier used for the UE to feed back the ACK/NACK.

Correspondingly, the obtaining, by the UE, the TPC or DAI that is used as the ACK/NACK channel resource indicator ARI, includes:

selecting, by the UE, one of the secondary carriers where the first uplink subframe corresponds to an uplink subframe, as a third secondary carrier;

using a TPC command word in the PDCCH information corresponding to the PDSCH carried on the third carrier as a TPC command word; and using a TPC command word in the PDCCH information corresponding to other PDSCHs as an ARI, where the other PDSCHs are carried on one or multiple secondary carriers among other secondary carriers than the third secondary carrier, and the ARI values are the same when the other PDSCHs are carried on multiple secondary carriers.

A subframe of the same time as the first uplink subframe is an uplink subframe on the first secondary carrier.

If there is one first secondary carrier, the determining a secondary carrier carrying the ACK/NACK channel resource includes: determining the secondary carrier carrying the ACK/NACK channel resource as the first secondary carrier;

and/or, if there are two or more first secondary carriers, the determining a secondary carrier carrying the ACK/NACK channel resource includes: determining the secondary carrier carrying the ACK/NACK channel resource as one first secondary carrier among the first secondary carriers;

The one secondary carrier among the first secondary carriers is one of the following secondary carriers:

a secondary carrier of the highest priority, a secondary carrier of the lightest load, a secondary carrier of the lowest frequency, a secondary carrier of the minimum index value, and a secondary carrier configured by the network-side device for the UE through signaling.

Correspondingly, if there are two or more first secondary carriers, and the secondary carrier carrying the ACK/NACK channel resource is a secondary carrier of the highest priority among the first secondary carriers, the method further includes:

determining priorities of secondary carriers among the first secondary carriers according to the load of the ACK/NACK corresponding to the first uplink subframe on each secondary carrier where the first uplink subframe is an uplink subframe, or the frequency of each secondary carrier, or the index configuration of each secondary carrier;

or, the method further includes:

determining priorities for secondary carriers configured for the UE, where the determining specifically includes: for each time, determining priorities for all secondary carriers where a subframe corresponding to the time is an uplink subframe; and determining priorities of secondary carriers among the first secondary carriers, where the determining specifically includes: obtaining priorities of all secondary carriers where a subframe corresponding to the time of the first uplink subframe is an uplink subframe.

The determining a secondary carrier carrying the ACK/NACK channel resource includes:

if the network-side device schedules only one secondary carrier and does not schedule a primary carrier for the UE, and the secondary carrier is a second secondary carrier, determining, by the UE, the second secondary carrier as the secondary carrier carrying the ACK/NACK channel resource.

Correspondingly, the identifier of the control channel element CCE occupied by the PDCCH corresponds to the ACK/NACK channel resource;

the determining, according to the indication of the PDCCH information, the ACK/NACK channel resource corresponding to the PDSCH, includes:

determining the ACK/NACK channel resource by using the identifier of a CCE among the CCEs occupied by the PDCCH.

Embodiment 2

Figure 4:
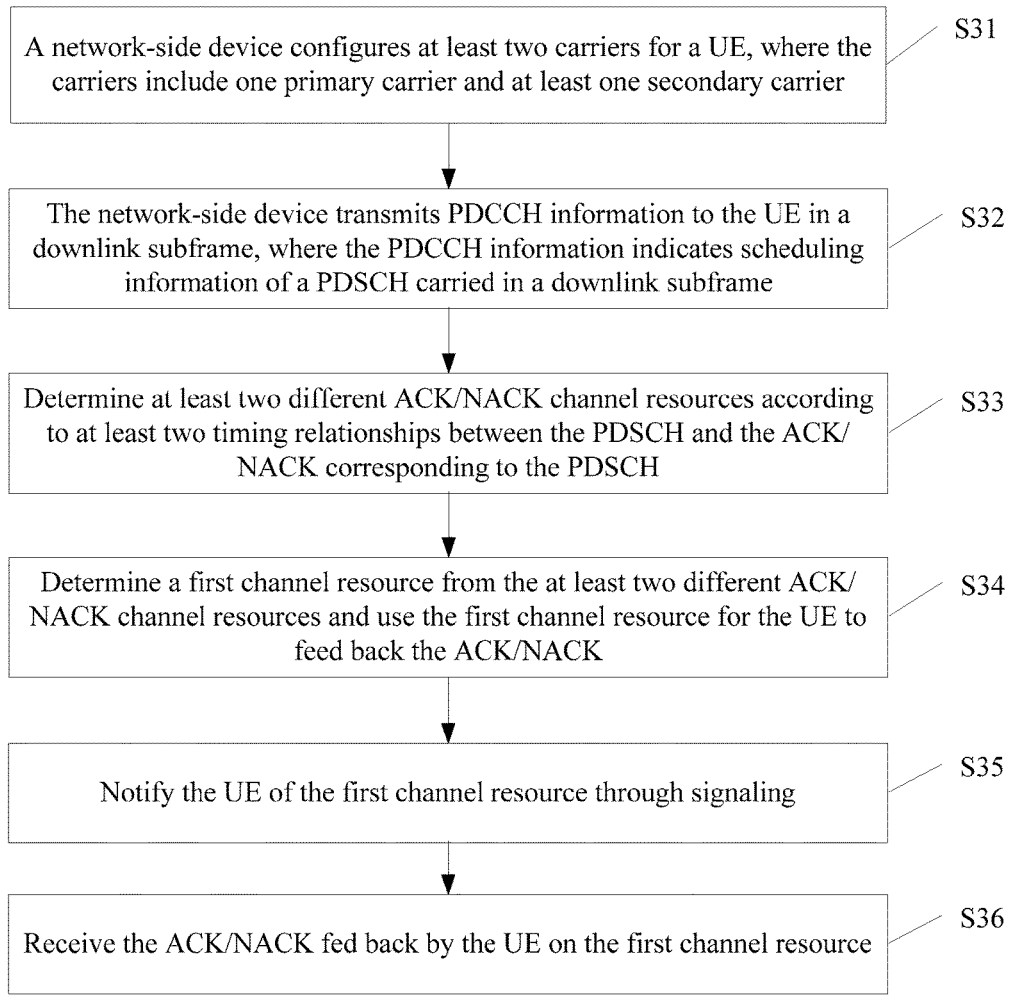
FIG. 4 is a flowchart of a method for transmitting acknowledgement or negative acknowledgement indication information in a TDD system according to Embodiment 2 of the present disclosure.

This embodiment provides a method for transmitting acknowledgement or negative acknowledgement indication information in a TDD system or similar system. As shown in FIG. 4, this method may be executed by a network-side device, and specifically includes:

S31. A network-side device configures at least two carriers for a UE, where the carriers include one primary carrier and at least one secondary carrier.

S32. The network-side device transmits PDCCH information to the UE in a downlink subframe, where the PDCCH information indicates scheduling information of a PDSCH carried in a downlink subframe.

S33. Determine at least two different ACK/NACK channel resources according to at least two timing relationships between the PDSCH and the ACK/NACK corresponding to the PDSCH.

S34. Determine a first channel resource from the at least two different ACK/NACK channel resources and use the first channel resource for the UE to feed back the ACK/NACK.

S35. Notify the UE of the first channel resource through signaling.

S36. Receive the ACK/NACK fed back by the UE on the first channel resource.

Figure 5:
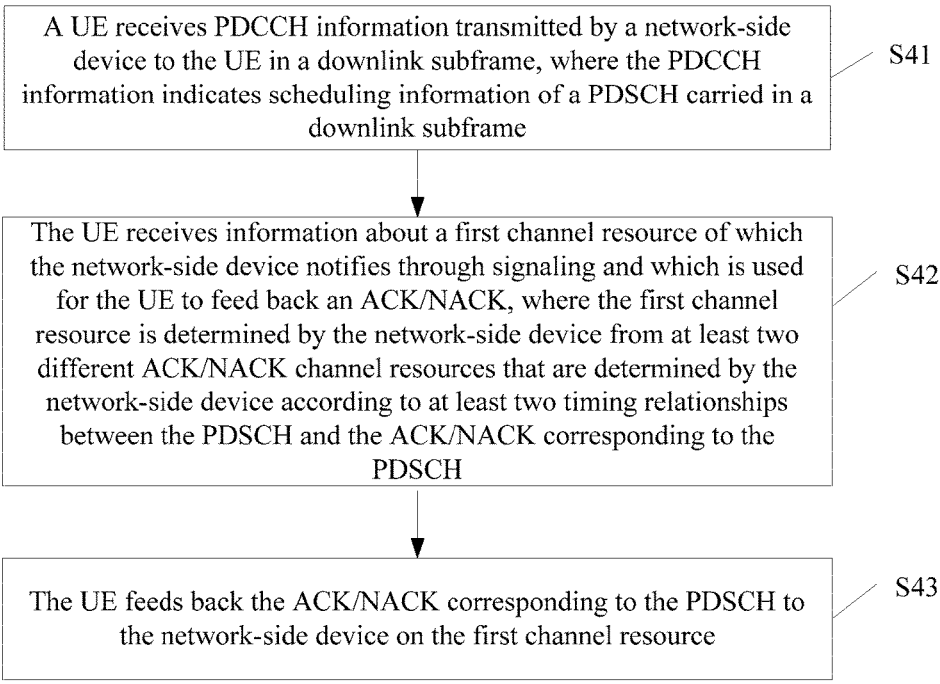
FIG. 5 is a flowchart of a method for transmitting acknowledgement or negative acknowledgement indication information in a TDD system according to Embodiment 2 of the present disclosure.

The method for transmitting acknowledgement or negative acknowledgement indication information in a TDD system according to this embodiment may be shown in FIG. 5; the method may also be executed by a UE, and specifically includes:

S41. A UE receives PDCCH information transmitted by a network-side device to the UE in a downlink subframe, where the PDCCH information indicates scheduling information of a PDSCH carried in a downlink subframe.

S42. The UE receives information about a first channel resource of which the network-side device notifies through signaling and which is used for the UE to feed back an ACK/NACK, where the first channel resource is determined by the network-side device from at least two different ACK/NACK channel resources that are determined by the network-side device according to at least two timing relationships between the PDSCH and the ACK/NACK corresponding to the PDSCH.

S43. The UE feeds back the ACK/NACK corresponding to the PDSCH to the network-side device on the first channel resource.

The at least two timing relationships include at least timing relationships that correspond to different carriers and/or correspond to different uplink subframes on a same carrier.

The at least two different ACK/NACK channel resources include: ACK/NACK channel resources carried in uplink subframes of different carriers at the same time, and/or, ACK/NACK channel resources in different uplink subframes. Specifically, the ACK/NACK channel resources in different uplink subframes may be different uplink subframes on different carriers or different uplink subframes on a same carrier.

Specifically, in step S34, the determining a first channel resource from the at least two different ACK/NACK channel resources includes:

selecting, according to loads of at least two different ACK/NACK channel resources, an ACK/NACK channel resource that has a lightest load, as a first channel resource;

or, selecting, according to delays of at least two different ACK/NACK channel resources, an ACK/NACK channel resource that has a shortest delay, as a first channel resource;

or, determining, according to loads and delays of at least two different ACK/NACK channel resources, a first channel resource from the at least two different ACK/NACK channel resources.

In step S35, the notifying the first channel resource to the UE through signaling includes one of the following:

notifying the UE of information about the first channel resource through an added bit of the PDCCH information, a TPC, or a DAI;

determining, according to a mapping relationship between a scrambling code and the ACK/NACK channel resource, a first scrambling code corresponding to the first channel resource, and notifying the first scrambling code to the UE through PDCCH information; and determining, according to a mapping relationship between a PDCCH time-frequency resource position and the ACK/NACK channel resource, a first PDCCH time-frequency resource position corresponding to the first channel resource, and notifying the UE of the first PDCCH time-frequency resource position through PDCCH information.

Correspondingly, in step S42, the receiving, by the UE, information about a first channel resource of which the network-side device notifies through signaling and which is used for the UE to feed back an ACK/NACK, includes one of the following:

receiving, by the UE, a first channel resource that is used for the UE to feed back the ACK/NACK and of which the network-side device notifies through an added bit of the PDCCH information, a TPC, a DAI, a first scrambling code corresponding to the first channel resource, or a first PDCCH time-frequency resource position corresponding to the first channel resource.

The signaling may be physical layer signaling (such as PDCCH information), or RLC (radio link control) layer signaling, or MAC (media access control) layer signaling, or RRC (radio resource control) layer signaling.

According to the method provided by this embodiment, the ACK/NACK of the secondary carrier may be adjusted to the ACK/NACK resource of the primary carrier for feedback, and the ACK/NACK of the primary carrier may also be adjusted to the ACK/NACK resource of the secondary carrier for feedback, which are described respectively through examples.

Figure 6:
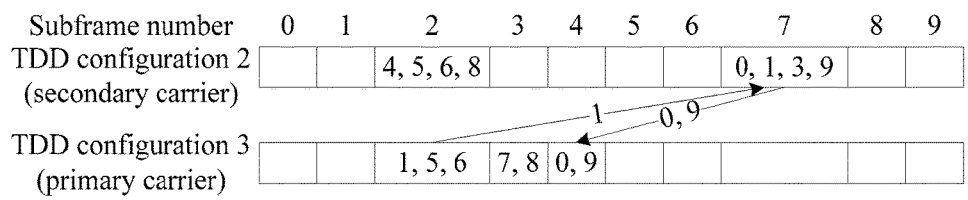
FIG. 6 is a schematic diagram of uplink and downlink subframe configurations and timing relationships in carrier aggregation according to Embodiment 2 of the present disclosure.

In the case that the ACK/NACK of the secondary carrier may be adjusted to the ACK/NACK resource of the primary carrier for feedback:

As shown in FIG. 6, the ACKs/NACKs corresponding to downlink subframes 0 and 9, in subframe 7 of the secondary carrier may be adjusted to the primary carrier for feedback, and may be adjusted, according to the timing relationship of the primary carrier, to subframe 4 of the primary carrier for feedback. Using PDCCH adjustment as an example, the network-side device may use a special value of the DAI (for example, the DAI is equal to 4) or a state of the TPC in the PDCCH scheduled in the downlink subframes 0 and 9 to indicate that the ACKs/NACKs corresponding to downlink subframes 0 and 9, in subframe 7 of the secondary carrier are adjusted to subframe 4 of the primary carrier for feedback; meanwhile, the ACK/NACK resource may be indicated by the TPC in the PDCCH, or an extra ACK/NACK resource is reserved separately for the handover, where the extra resource is a resource outside the resource set indicated by the ARI.

The above adjusting method reduces the ACK/NACK load and feedback delay on subframe 7 of the secondary carrier. Specifically, if the ACKs/NACKs corresponding to subframes 0 and 9 are fed back in subframe 7 of the secondary carrier, the feedback delays are 7 and 8 respectively; after the adjusting, the feedback delays are 4 and 5 respectively.

In the case that the ACK/NACK of the primary carrier may be adjusted to the ACK/NACK resource of the secondary carrier for feedback:

As shown in FIG. 6, the ACK/NACK corresponding to downlink subframe 1, in subframe 2 of the primary carrier may be adjusted to the primary carrier for feedback, and may be adjusted, according to the timing relationship of the secondary carrier, to subframe 7 of the secondary carrier for feedback. Using PDCCH adjustment as an example, the network-side device may use a special value of the DAI (for example, the DAI is equal to 4) or a state of the TPC in the PDCCH scheduled by downlink subframe 1 to indicate that the ACK/NACK corresponding to downlink subframe 1, in subframe 2 of the primary carrier is adjusted to subframe 7 of the secondary carrier for feedback; meanwhile, the ACK/NACK resource may be indicated by the TPC (or DAI) in the PDCCH, or an extra ACK/NACK resource is reserved separately for the handover, where the extra resource is a resource outside the resource set indicated by the ARI.

In this embodiment, the network-side device configures at least two carriers for the UE, where the carriers includes one primary carrier and at least one secondary carrier; transmits PDCCH information to the UE in a downlink subframe, where the PDCCH information indicates scheduling information of a PDSCH carried by a downlink subframe; determines at least two different ACK/NACK channel resources according to at least two timing relationships between the PDSCH and the ACK/NACK corresponding to the PDSCH; determines a first channel resource from the at least two different ACK/NACK channel resources and uses the first channel resource for the UE to feed back the ACK/NACK; notifies the first channel resource to the UE through signaling; and receives the ACK/NACK fed back by the UE on the first channel resource. Therefore, the ACK/NACK can also be fed back when carriers of different uplink and downlink subframe configurations are aggregated. In addition, the loads of ACKs/NACKs on carriers may be balanced, and the ACK/NACK feedback delay may be reduced.

The embodiment of the present disclosure also provides a method for transmitting acknowledgement or negative acknowledgement indication information. This embodiment is applicable to a TDD system, an FDD system, and a system where TDD and FDD carriers are aggregated.

Figure 16:
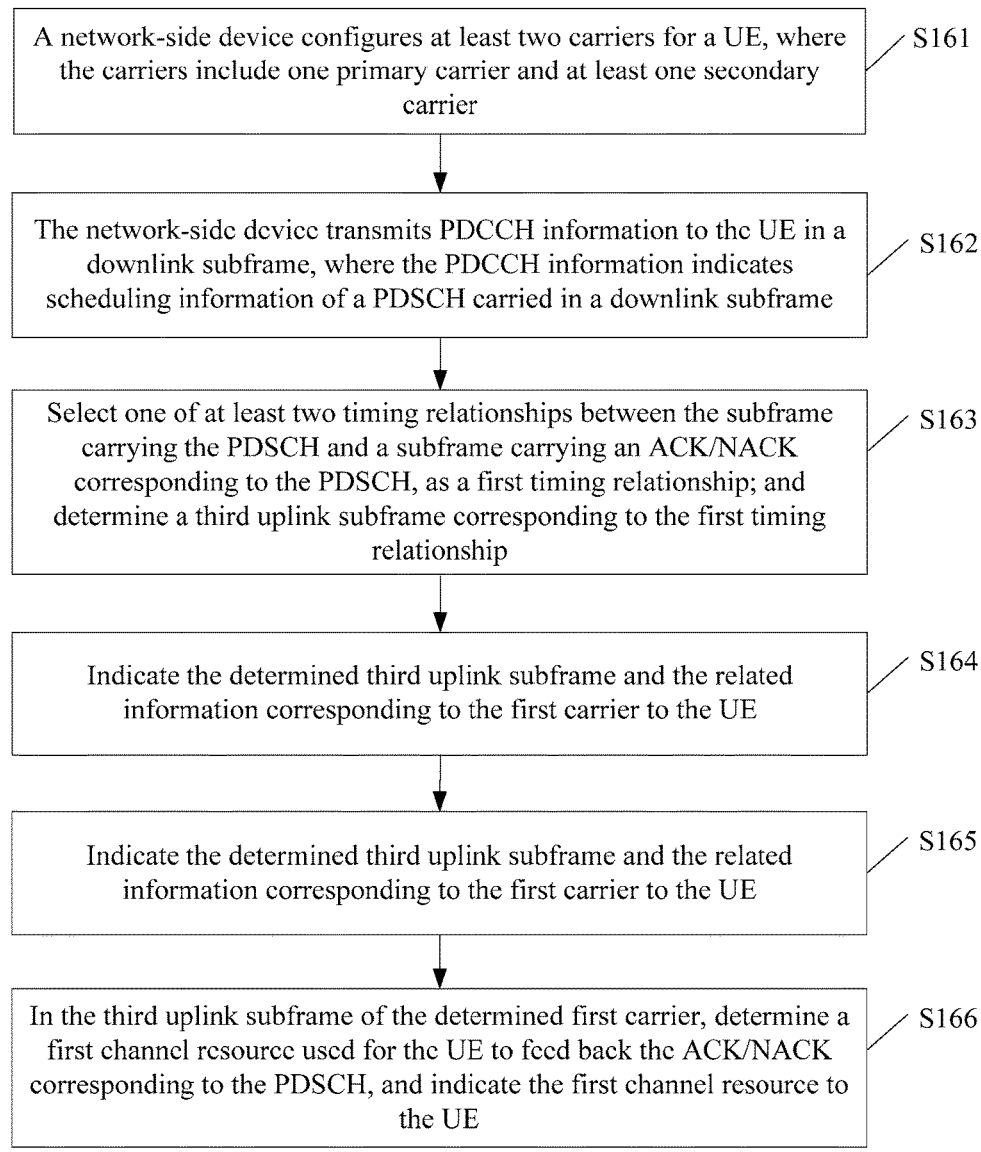
FIG. 16 is a flowchart of another method for transmitting acknowledgement or negative acknowledgement indication information according to Embodiment 2 of the present disclosure.

As shown in FIG. 16, this method may be executed by a network-side device, and specifically includes:

S161. A network-side device configures at least two carriers for a UE, where the carriers include one primary carrier and at least one secondary carrier.

The primary carrier may use one of the FDD and TDD duplex modes; no matter whether the primary carrier is a carrier of the FDD or TDD duplex mode, the secondary carrier may use one of the FDD and TDD duplex modes. Of course, the primary carrier and secondary carrier may also be a carrier of other modes, which is not limited here, so long as the solution of the present disclosure can be implemented. In addition, the primary carrier in the present disclosure may be a carrier for the UE to independently access, or a carrier for the UE in an idle state to camp on, or a carrier for the UE to perform radio link failure detection; the primary carrier in the present disclosure may also be a carrier that cannot provide independent access for the UE but can only be used when the UE is in a connected state.

S162. The network-side device transmits PDCCH information to the UE in a first downlink subframe, where the PDCCH information indicates scheduling information of a PDSCH carried in a second downlink subframe.

The first downlink subframe and the second downlink subframe may be the same subframe or may also be different subframes. The first downlink subframe and the second downlink subframe may be on the same carrier or may also be on different carriers, where the latter is also referred to as cross-carrier scheduling.

The PDCCH may be a PDCCH demodulated based on a cell-specific reference signal in an LTE system, or may also be an enhanced PDCCH demodulated based on a cell-specific reference signal in the LTE system.

S163. Select one of at least two timing relationships between the subframe carrying the PDSCH and a subframe carrying an ACK/NACK corresponding to the PDSCH, as a first timing relationship; and determine a third uplink subframe corresponding to the first timing relationship and used for the UE to transmit the ACK/NACK corresponding to the PDSCH.

On a first carrier corresponding to the first timing relationship, a subframe of the same time as the second downlink subframe is a downlink subframe, and this may be called a first condition. Thereby, it can be ensured that the determined third uplink subframe is a subframe that can be used for the UE to feed back the ACK/NACK.

Specifically, the at least two timing relationships may include timing relationships corresponding to different carriers; and/or, include timing relationships corresponding to a same carrier. In this case, with respect to different timing relationships, uplink subframes corresponding to the downlink subframes on the carrier and used for ACK/NACK feedback are different.

In the case that at least two timing relationships correspond to different carriers, for example, the timing relationships between the subframe carrying the PDSCH and the subframe carrying the ACK/NACK may be (n, n+4), that is, if the UE receives the PDSCH in subframe n, the UE feeds back the ACK/NACK corresponding to the PDSCH in subframe n+4; the timing relationship in the TDD carrier may be indicated by (n, n+k), where k may be greater than or equal to 4, because the fourth subframe after the PDSCH may be not an uplink subframe for the TDD system. Particularly, ensuring that k is greater than or equal to 4 takes the processing delay of the PDSCH into account, and in the future, other values may also be used.

In the case that at least two timing relationships correspond to a same carrier, assuming that a downlink subframe on a carrier carries a PDSCH, the ACK/NACK corresponding to the PDSCH may be not only fed back in an uplink subframe of the carrier, but also fed back in another uplink subframe of the carrier, where the different uplink subframes correspond to different timing relationships. The carrier may be a TDD carrier, or an FDD carrier, or other carriers.

The selecting a timing relationship may be implemented in multiple manners, for example, random selection, and the timing relationship may also be selected according to different carriers corresponding to the timing relationships or different uplink subframes used for ACK/NACK feedback. Of course, the selected first timing relationship first needs to satisfy the condition: on a first carrier corresponding to the first timing relationship, a subframe of the same time as the second downlink subframe is a downlink subframe.

Specifically, if the timing relationships correspond to different carriers, a timing relationship corresponding to a carrier that has the lightest load may be selected according to the loads of the ACK/NACK channels on the carriers; or a timing relationship corresponding to a carrier that has the shortest feedback delay may be selected according to the ACK/NACK feedback delay on the carriers; or a timing relationship corresponding to a carrier where transmit power required by the UE is the lowest may be selected. In the case that selection is performed according to transmit power, assuming that the UE is far from a macro cell carrying the primary carrier but is near to a micro cell carrying the secondary carrier, the network-side device may select the timing relationship corresponding to the secondary carrier for the UE, because the transmit power required by the UE when the secondary carrier is selected is lower than the transmit power required by the UE when the primary carrier is selected. Of course, the following may also be considered comprehensively: load, feedback delay, and transmit power.

If the timing relationships correspond to a same carrier, it is necessary to consider different uplink subframes corresponding to timing relationships on the carrier. Specifically, according to loads of ACK/NACK channels in different uplink subframes, a timing relationship corresponding to an uplink subframe that has the lightest load may be selected; or according to the ACK/NACK feedback delay in the uplink subframes, a timing relationship corresponding to an uplink subframe that has the shortest feedback delay may be selected. Of course, the following may also be considered comprehensively: load and feedback delay.

For the determining a third uplink subframe in the above step, a third uplink subframe used for the UE to send an ACK/NACK corresponding to the PDSCH may be determined according to the first timing relationship and the subframe carrying the PDSCH, namely, the second downlink subframe.

S164. Determine a first carrier used for the UE to transmit the ACK/NACK corresponding to the PDSCH.

After the first timing relationship is determined, the first carrier may be determined according to the first timing relationship. Specifically, no matter whether different timing relationships correspond to different carriers or different timing relationships correspond to a same carrier, the first carrier corresponding to the first timing relationship may be determined according to the mapping relationships between timing relationships and carriers.

Steps S163 and S164 may also be implemented in another manner, that is, first determining the first carrier, and then determining the corresponding first timing relationship according to the determined first carrier. Specifically:

S163'. Determine a first carrier used for the UE to transmit the ACK/NACK corresponding to the PDSCH.

If different timing relationships correspond to different carriers, a carrier may be selected randomly as a first carrier. Or a carrier that has the lightest load may be selected as a first carrier according to loads of ACK/NACK channels in the carriers; or a carrier that has the shortest feedback delay is selected as a first carrier according to the ACK/NACK feedback delays in the carriers; or a carrier where transmit power required by the UE is the lowest is selected as a first carrier. Of course, the following may also be considered comprehensively: load, feedback delay, and transmit power.

When the first carrier is determined, it is necessary to guarantee that the timing relationship corresponding to the selected carrier meets the condition that on a first carrier corresponding to the timing relationship, a subframe of the same time as the second downlink subframe is a downlink subframe, so that it may be ensured that the determined third uplink subframe is a subframe that can be used for the UE to feed back the ACK/NACK.

S164'. Select one of at least two timing relationships between the subframe carrying the PDSCH and a subframe carrying an ACK/NACK corresponding to the PDSCH, as a first timing relationship; and determine a third uplink subframe corresponding to the first timing relationship and used for the UE to transmit the ACK/NACK corresponding to the PDSCH.

For the above processing of selecting one timing relationship as a first timing relationship, if different timing relationships correspond to different carriers, the timing relationship corresponding to the first carrier may be determined according to the first carrier determined in step S163'. Afterward, a third uplink subframe used for the UE to transmit the ACK/NACK corresponding to the PDSCH may be determined according to the first timing relationship and the subframe carrying the PDSCH, namely, the second downlink subframe.

If different timing relationships correspond to a same carrier, it is necessary to consider different uplink subframes corresponding to timing relationships on the carrier. Specifically, according to loads of ACK/NACK channels in different uplink subframes, a timing relationship corresponding to an uplink subframe that has the lightest load may be selected; or according to the ACK/NACK feedback delay on the carriers, a timing relationship corresponding to an uplink subframe that has the shortest feedback delay may be selected. Of course, the following may also be considered comprehensively: load and feedback delay. In this case, because the first timing relationship is determined according to the uplink subframe, the uplink subframe used for determining the first timing relationship is a third uplink subframe used for the UE to transmit the ACK/NACK corresponding to the PDSCH.

As described in step S163, for step S164', the selected first timing relationship also needs to meet the condition that on a first carrier corresponding to the first timing relationship, a subframe of the same time as the second downlink subframe should be a downlink subframe, so that it may be ensured that the determined third uplink subframe is a subframe that can be used for the UE to feed back the ACK/NACK.

Correspondingly, when the first carrier or third uplink subframe is selected, if the corresponding first timing relationship cannot meet the above condition, reselection needs to be performed, so that the first timing relationship meets the condition. In other words, when the first carrier or third uplink subframe is selected, it is necessary to consider, at the same time, that the first timing relationship needs to meet the condition.

S165. Indicate the determined third uplink subframe and the related information corresponding to the first carrier to the UE.

When the UE learns the first timing relationship selected by the network-side device, the UE correspondingly learns the first carrier corresponding to the first timing relationship, for example, determines, according to the mapping relationships between timing relationships and carriers, a third uplink subframe used for the UE to transmit the ACK/NACK corresponding to the PDSCH. Therefore, the indicating step of step S165 may be specifically: indicating the selected first timing relationship to the UE. That is, related information corresponding to the third uplink subframe and the first carrier is the first timing relationship. Specifically, the first timing relationship may be indicated through layer-1 signaling and/or RRC signaling.

If timing relationships correspond to different carriers, the network-side device may indicate only the selected first carrier to the UE. Correspondingly, the UE may determine, according to the first carrier, the first timing relationship corresponding to the first carrier, and further determine, according to the first timing relationship, a third uplink subframe used for the UE to transmit the ACK/NACK corresponding to the PDSCH. Therefore, the indicating step of step S165 may be specifically: indicating the selected first carrier to the UE. That is, related information corresponding to the third uplink subframe and the first carrier is the first carrier. Specifically, the first carrier may be indicated through layer-1 signaling and/or RRC signaling.

Of course, related information of the third uplink subframe and the first carrier may also be the third uplink subframe and the first carrier information. Correspondingly, the network-side device may indicate the third uplink subframe and the first carrier to the UE through layer-1 signaling and/or RRC signaling.

S166. In the third uplink subframe of the determined first carrier, determine a first channel resource used for the UE to feed back the ACK/NACK corresponding to the PDSCH, and indicate the first channel resource to the UE.

The first channel resource may be selected randomly, or may also be selected by the network-side device according to channel loads and so on, which is not specifically limited by the present disclosure.

For the indicating the first channel resource to the UE, specifically, the ACK/NACK channel resource may be indicated to the UE in an implicit indicating manner. For example, the ACK/NACK channel resource may implicitly correspond to the identifier of a CCE occupied by the PDCCH. Thereby, the network-side device should receive, on an ACK/NACK channel resource corresponding to a CCE that is used by the network-side device to schedule the PDCCH, the ACK/NACK transmitted by the UE. Correspondingly, the UE may determine, according to the CCE that schedules the PDCCH, a channel resource that corresponds to the CCE and is used for the UE to feed back the ACK/NACK, where the CCE may also be an enhanced CCE corresponding to an enhanced PDCCH.

The ACK/NACK channel resource may also be indicated explicitly through signaling, for example, one or a group of ACK/NACK channel resources is reserved through RRC signaling. If one ACK/NACK channel resource is reserved, the network-side device receives, on the channel resource, the ACK/NACK transmitted by the UE; and correspondingly, the UE may learn that the reserved channel resource is a channel resource used for the UE to feed back the ACK/NACK. If a group of ACK/NACK channel resources is reserved, the network-side device further needs to dynamically indicate, through the PDCCH, which resource in the group of ACK/NACK channel resources is used as a channel resource for the UE to feed back the ACK/NACK; and correspondingly, the UE may learn that the resource dynamically indicated by the PDCCH in the group of channel resources is a channel resource that may be used for the UE to feed back the ACK/NACK; the network-side device needs to receive, on the channel resource dynamically indicated, the ACK/NACK transmitted by the UE. Specifically, the channel resource may be dynamically indicated through a bit or scrambling code in the PDCCH.

It should be noted that the information in the two steps S165 and S166 may be indicated by the network-side device to the UE by obtaining a same piece of signaling, or may also be indicated through different signaling.

S167. Receive the ACK/NACK fed back by the UE on the first channel resource in the third subframe of the first carrier.

Figure 17:
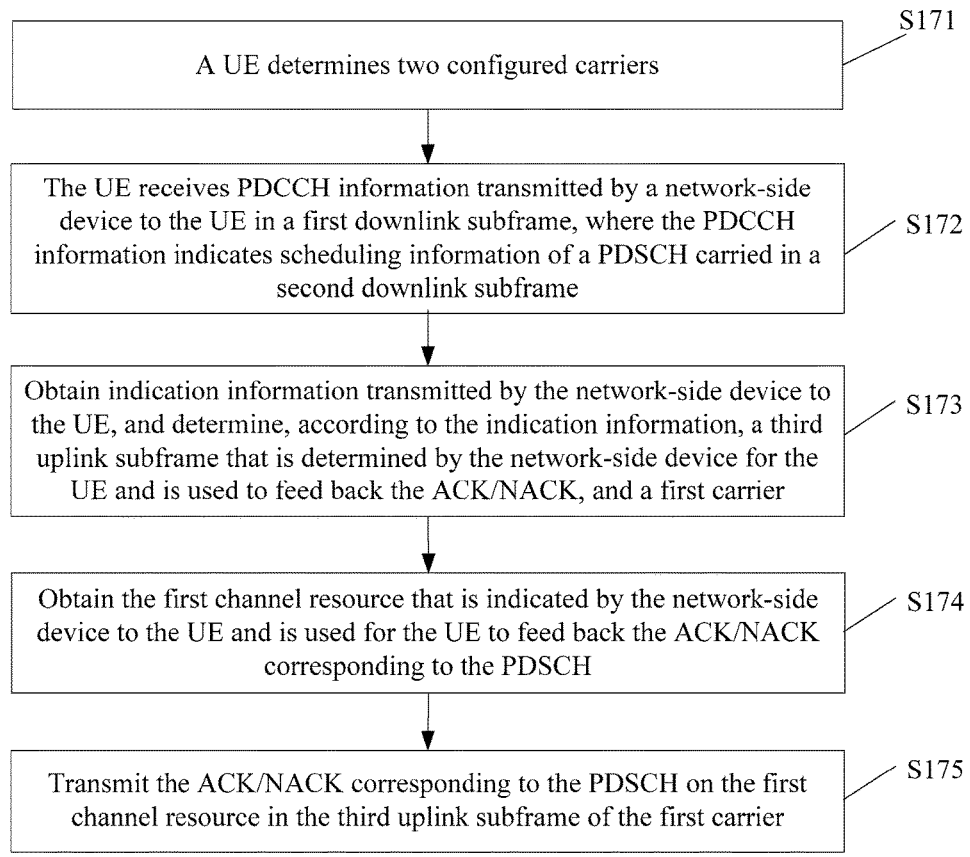
FIG. 17 is a flowchart of another method for transmitting acknowledgement or negative acknowledgement indication information according to Embodiment 2 of the present disclosure.

The method for transmitting acknowledgement or negative acknowledgement indication information according to this embodiment may be as shown in FIG. 17; the method may also be executed by a UE, and specifically includes:

S171. A UE determines two configured carriers, where the carriers include one primary carrier and at least one secondary carrier.

The primary carrier and secondary carrier are specifically the same as those in step S161, and are not further described here.

S172. The UE receives PDCCH information transmitted by a network-side device to the UE in a first downlink subframe, where the PDCCH information indicates scheduling information of a PDSCH carried in a second downlink subframe.

The relationship between the first downlink subframe and the second downlink subframe, and the specific PDCCH, are described as step S162, and are not further described here.

S173. Obtain indication information transmitted by the network-side device to the UE, and determine, according to the indication information, a third uplink subframe that is determined by the network-side device for the UE and is used to feed back the ACK/NACK, and a first carrier.

The indication information is related information corresponding to the third uplink subframe and the first carrier that are determined by the network-side device for the UE for ACK/NACK feedback. Specifically, the indication information may be sent by the network-side device to the UE through layer-1 signaling and/or RRC signaling.

As described in step S165, the related information may be a first timing relationship selected by the network-side device, or a first carrier determined by the network-side device. For the selected first timing relationship, on a first carrier corresponding to the first timing relationship, a subframe of the same time as the second downlink subframe should be a downlink subframe, so that it may be ensured that the determined third uplink subframe is a subframe that can be used for the UE to feed back the ACK/NACK.

If the obtained related information is a first timing relationship, the third uplink subframe and first carrier are determined according to the indication information, which may specifically include: according to the first timing relationship and the subframe carrying the PDSCH, namely, the second downlink subframe, determining a third uplink subframe used for the UE to transmit the ACK/NACK corresponding to the PDSCH, and determining, according to the mapping relationships between timing relationships and carriers, and the first timing relationship, a first carrier corresponding to the first timing relationship.

If the obtained related information is the first carrier, the third uplink subframe and the first carrier are determined according to the indication information, which may specifically include: determining, by the UE according to the first carrier and the mapping relationships between carriers and timing relationships, a first timing relationship corresponding to the first carrier, and then determining a corresponding third uplink subframe according to the first timing relationship and the subframe carrying the PDSCH, namely, the second downlink subframe.

S174. Obtain the first channel resource that is indicated by the network-side device to the UE and is used for the UE to feed back the ACK/NACK corresponding to the PDSCH.

Corresponding to step S166, the UE may determine the first ACK/NACK channel resource by receiving layer-1 signaling and/or RRC signaling. Specifically, if the network-side device uses an implicit indicating manner, for example, the ACK/NACK channel resource may implicitly correspond to the identifier of the CCE occupied by the PDCCH. Thereby, the UE may correspondingly determine that the ACK/NACK channel resource corresponding to the CCE or a CCE among the CCEs on which the UE receives the PDCCH, is the ACK/NACK channel resource configured by the network-side device for the UE, so that the UE can transmit the ACK/NACK on the channel resource. If the network-side device may use a signaling explicit indicating mode, for example, reserve one or a group of ACK/NACK channel resources, if one ACK/NACK channel resource is reserved, the UE may determine that the channel resource is an ACK/NACK channel resource configured by the network-side device for the UE, and therefore, can transmit the ACK/NACK on the channel resource; if a group of ACK/NACK channel resources is reserved, the UE further needs to dynamically obtain, through the PDCCH, which resource in the group of ACK/NACK channel resources is used as a channel resource for current ACK/NACK feedback. Correspondingly, the UE transmits the ACK/NACK on the dynamically obtained channel resource. Specifically, the PDCCH may be dynamically indicated through a bit or scrambling code in the PDCCH.

It should be noted that the information in steps S173 and S174 may be obtained by the UE by obtaining a same piece of signaling or obtaining different signaling.

S175. Send the ACK/NACK corresponding to the PDSCH on the first channel resource in the third uplink subframe of the first carrier.

In addition, in the present disclosure, the carrier corresponds to the serving cell. Specifically, for the FDD system, a serving cell includes a downlink carrier and an uplink carrier corresponding to the downlink carrier; for the TDD system, a serving cell corresponds to a TDD carrier.

The layer-1 signaling may correspond to the PDCCH.

Specifically, the network-side device may notify the UE of information about the first channel resource through an added bit of the PDCCH information, a TPC, or a DAI.

or determine, according to a mapping relationship between a scrambling code and the ACK/NACK channel resource, a first scrambling code corresponding to the first channel resource, and notify the UE of the first scrambling code through PDCCH information;

or determine, according to a mapping relationship between a PDCCH time-frequency resource position and the ACK/NACK channel resource, a first PDCCH time-frequency resource position corresponding to the first channel resource, and notify the UE of the first PDCCH time-frequency resource position through PDCCH information.

Correspondingly, the receiving, by the UE, information about a first channel resource of which the network-side device notifies through signaling and which is used for the UE to feed back an ACK/NACK, may include one of the following:

receiving, by the UE, a first channel resource that is used for the UE to feed back the ACK/NACK and of which the network-side device notifies through an added bit of the PDCCH information, a TPC, a DAI, a first scrambling code corresponding to the first channel resource, or a first PDCCH time-frequency resource position corresponding to the first channel resource.

The signaling may be physical layer signaling (such as PDCCH information), or RLC (radio link control) layer signaling, or MAC (media access control) layer signaling, or RRC (radio resource control) layer signaling.

By using the above implementation solutions, in a system where at least two TDD carriers of different uplink and downlink subframe configurations are aggregated or a system where at least one FDD carrier and at least one TDD carrier are aggregated, a network-side device selects a first timing relationship from at least two timing relationships, and on a first carrier corresponding to the first timing relationship, a subframe of the same time as the second downlink subframe is a downlink subframe, thereby configuring a subframe, a carrier, and a corresponding channel resource that can be used for ACK/NACK feedback for the UE. Therefore, it can be guaranteed that the UE not only can perform ACKK/NACK feedback, but also can perform flexible ACK/NACK feedback. In addition, the solutions of the present disclosure are also applicable to a system where at least two TDD carriers of the same uplink and downlink subframe configurations are aggregated, or a system where at least two FDD carriers are aggregated, or similar systems.

In addition, the above implementation solutions make it possible to choose to feed back the ACK/NACK in different carriers or different subframes of a same carrier. Therefore, the solutions may also balance ACK/NACK feedback loads on all carriers or all subframes. Further, when the first timing relationship or first carrier is selected according to the ACK/NACK feedback delay, the ACK/NACK feedback delay may be further reduced. In addition, in a scenario where the network-side device transmits different carriers at different geographic locations, for example, a macro base station corresponds to a carrier and a micro base station corresponds to another carrier, the network-side device may select a carrier where the transmit power needed by the UE is low, for the UE to perform ACK/NACK feedback, thereby reducing power consumption of the UE and improving performance of the network-side device in receiving the ACK/NACK.

According to the method provided by this embodiment, the ACK/NACK of the secondary carrier may be adjusted to the ACK/NACK resource of the primary carrier for feedback, and the ACK/NACK of the primary carrier may also be adjusted to the ACK/NACK resource of the secondary carrier for feedback.

For the case that the ACK/NACK of the secondary carrier may be adjusted to the ACK/NACK resource of the primary carrier for feedback, and the case that the ACK/NACK of the primary carrier may also be adjusted to the ACK/NACK resource of the secondary carrier for feedback, the specific adjustment is illustrated in FIG. 6 and described above, therefore not further described here.

In the solutions provided by Embodiment 1 and Embodiment 2, both the Pcell and the Scell can transmit the ACK/NACK. Considering the adjacent channel interference suppression problem, carriers in TDD carrier aggregation with different uplink and downlink configurations should belong to different bands, that is, frequencies of aggregated multiple carriers are far away from each other. Assuming that two TDD carriers C0 and C1 of different uplink and downlink configurations are aggregated, where C0 is in a low band and C1 is in a high band, cell coverage on C0 is greater than cell coverage on C1. Therefore, for a UE located at a cell edge, the network-side device may configure the uplink ACK/NACK of the UE to the low-band carrier C0 with good cell coverage. Particularly, if the low-band carrier is a primary carrier of the UE, the network-side device may configure the uplink ACK/NACK of the UE to the primary carrier.

Another solution provided by the present disclosure according to the above analysis, on the network-side device, includes:

determining, by the network-side device, one of multiple ACK/NACK feedback modes; and notifying, by the network-side device, the UE of the ACK/NACK feedback mode through signaling, so that the UE performs ACK/NACK feedback according to the ACK/NACK feedback mode and preconfigured ACK/NACK timing relationships.

Based on the above solution, the ACK/NACK feedback mode may be that the ACK/NACK may be fed back on a Pcell or an Scell, or, the ACK/NACK feedback mode may be that the ACK/NACK can only be fed back on a carrier, where the carrier may be a primary carrier or a carrier of a low frequency.

Based on the above solution, preferably, the signaling may be radio resource control (RRC) dedicated signaling, broadcast signaling or layer-1/layer-2 signaling (such as PDCCH).

Based on the above solution, the preconfigured ACK/NACK timing relationships are timing relationships that are learnt by the UE after the UE receives the signaling in the above solution, may be timing relationships of the conventional system, or timing relationships modified according to the conventional system.

Another solution provided by the present disclosure, on the UE side, includes:

obtaining signaling that is notified by the network-side device and is used to configure an ACK/NACK feedback mode; and performing, by the UE, ACK/NACK feedback according to the signaling and preconfigured ACK/NACK timing relationships.

The ACK/NACK feedback mode and ACK/NACK timing relationship in the above solution are described in the corresponding network-side device solution, and are not further described here.

The embodiments corresponding to FIG. 16 and FIG. 17 solve the following technical problem: if the ACK/NACK is always fed back on the primary carrier, in some scenarios, the ACK/NACK may fail to be fed back, for example, when on a first carrier corresponding to a timing relationship, a subframe of the same time as the subframe carrying the downlink PDSCH is an uplink subframe, the first carrier corresponding to the timing relationship cannot be used to carry the ACK/NACK corresponding to the PDSCH. Further, if the downlink data, is scheduled in an uplink subframe on the conventional TDD carrier or is scheduled in an uplink subframe used for uplink ACK/NACK feedback on a dynamic subframe TDD carrier (the ACK/NACK feedback is decided by the second TDD configuration), the ACK/NACK cannot be fed back on the current TDD carrier according to the ACK/NACK timing relationship on the current TDD carrier or the ACK/NACK timing relationship under the second TDD configuration.

With respect to the above problem, the present disclosure further provides a method for transmitting acknowledgement or negative acknowledgement indication information. The embodiment of the present disclosure is applicable to a TDD system, an FDD system, and a system where TDD and FDD carriers are aggregated.

This method may be executed by a network-side device, and specifically includes:

Step i1. A network-side device configures at least two carriers for a UE, where the carriers include at least one TDD carrier.

Step i2. The network-side device transmits PDCCH information to the UE in a fifth subframe on one of the TDD carriers, where the PDCCH information indicates scheduling information of a PDSCH carried in a fourth uplink subframe.

The fifth subframe may be an uplink subframe or may also be a downlink subframe. When the fifth subframe is an uplink subframe, it may be a same uplink subframe as the fourth uplink subframe, and of course, may also be an uplink subframe different from the fourth uplink subframe. The fifth subframe may be on the TDD carrier or may also be on other carriers.

The at least one TDD carrier may use a dynamic subframe configuration, that is, at least one subframe may exist on the TDD carrier, where the subframe may be dynamically used as an uplink or downlink subframe. Specifically, the uplink and downlink configuration notified by system information is a first TDD configuration, for example, the subframe configuration under the first TDD configuration is configuration 0, namely, "DL DL UL UL UL", while the uplink ACK/NACK feedback timing may be performed according to the second TDD configuration, where the second TDD configuration may be configured through a RRC dedicated signaling. Assuming that the subframe configuration under the second configuration is configuration 2, namely, "DL DL UL DL DL", under the above configuration, if downlink data of the fourth or fifth subframe is scheduled, the corresponding ACK/NACK may be fed back according to the timing relationship of the second TDD configuration. The fourth uplink subframe may be a third subframe under the above configuration, namely, an uplink subframe under the second TDD configuration of the dynamic subframe TDD carrier.

The fourth uplink subframe is a subframe temporarily used for transmitting the downlink PDSCH data, and/or, the uplink subframe may carry the uplink ACK/NACK when not transmitting the downlink PDSCH data.

Step i3. Determine the second carrier where the UE transmits the ACK/NACK corresponding to the PDSCH, where the second carrier is a carrier other than the TDD carrier, and specifically may be an FDD carrier or a TDD carrier.

Because the fourth uplink subframe is an uplink subframe on the conventional TDD carrier (non-dynamic subframe TDD carrier), or an uplink subframe under the second TDD configuration of the dynamic subframe TDD carrier, if downlink data transmission is scheduled in the fourth uplink subframe, namely, PDSCH transmission, according to the ACK/NACK timing relationship on the conventional TDD carrier or the ACK/NACK timing relationship on the dynamic subframe TDD carrier, namely, an ACK/NACK timing relationship under the second TDD configuration, the corresponding ACK/NACK corresponding to the PDSCH cannot be fed back. Therefore, the ACK/NACK corresponding to the PDSCH needs to be transmitted on other carriers.

If the number of carriers, except the current TDD carrier, configured for the UE is 1, the carrier for the ACK/NACK feedback is a carrier other than the current TDD carrier; if the number of carriers, except the current TDD carrier, configured for the UE is greater than 1, according to the ACK/NACK load and/or feedback delay, among the carriers except the current TDD carrier, the second carrier is determined for ACK/NACK feedback, and then the information about the second carrier may be notified to the UE through layer-1 signaling or RRC signaling.

Step i4. Determine a second timing relationship of the ACK/NACK feedback corresponding to the PDSCH, and determine, according to the second timing relationship, the sixth subframe in which the ACK/NACK is fed back.

The network-side device may determine the second timing relationship through the second carrier, and specifically, may use the timing relationship between the PDSCH on the second carrier and the ACK/NACK as the second timing relationship.

The sequence of steps i3 and i4 may be interchanged, that is, the second timing relationship may be first determined, and then the second carrier and the sixth subframe for ACK/NACK feedback may be determined according to the second timing relationship.

Step i5. In the sixth subframe of the second carrier, determine a second channel resource for the UE to feed back the ACK/NACK, and indicate the second channel resource to the UE.

Specifically, the ACK/NACK channel resource may be indicated in an implicit manner, for example, the ACK/NACK channel resource may implicitly correspond to the identifier of the CCE occupied by the PDCCH. Thereby, the network-side device receives, on an ACK/NACK channel resource corresponding to a CCE that is used by the network-side device to schedule the PDCCH, the ACK/NACK transmitted by the UE, where the CCE may also be an enhanced CCE corresponding to an enhanced PDCCH; and the ACK/NACK channel resource may also be indicated explicitly through signaling, for example, one or a group of ACK/NACK channel resources is reserved through RRC signaling. If one ACK/NACK channel resource is reserved, the network-side device receives, on the channel resource, the ACK/NACK transmitted by the UE. If a group of ACK/NACK channel resources is reserved, the network-side device further needs to dynamically indicate, through the PDCCH, which resource in the group of ACK/NACK channel resources is used as a channel resource for the current UE to feed back the ACK/NACK; and correspondingly, the network-side device receives, on the channel resource dynamically indicated, the ACK/NACK transmitted by the UE. Specifically, the channel resource may be indicated by a bit or scrambling code in the PDCCH.

Step i6. Receive the ACK/NACK that is transmitted by the UE on the second channel resource in the sixth subframe of the second carrier.

The corresponding method on the UE side is as follows:

Step j1. A UE determines configured at least two carriers, where the carriers include at least one TDD carrier.

Step j2. Receive PDCCH information in a fifth subframe on one of the TDD carriers, where the PDCCH information indicates scheduling information of a PDSCH carried in a fourth uplink subframe.

The fifth subframe may be an uplink subframe or may also be a downlink subframe. When the fifth subframe is an uplink subframe, it may be a same uplink subframe as the fourth uplink subframe, and of course, may also be an uplink subframe different from the fourth uplink subframe. The fifth subframe may be on the TDD carrier or may also be on other carriers.

The at least one TDD carrier may use a dynamic subframe configuration, that is, at least one subframe may exist on the TDD carrier, where the subframe may be dynamically used as an uplink or downlink subframe. Specifically, the uplink and downlink configuration notified by system information is a first TDD configuration, for example, the subframe configuration under the first TDD configuration is configuration 0, namely, "DL DL UL UL UL", while the uplink ACK/NACK feedback timing may be performed according to the second TDD configuration, where the second TDD configuration may be configured through a RRC dedicated signaling. Assuming that the subframe configuration under the second configuration is configuration 2, namely, "DL DL UL DL DL", under the above configuration, if downlink data of the fourth or fifth subframe is scheduled, the corresponding ACK/NACK may be fed back according to the timing relationship of the second TDD configuration.

The fourth uplink subframe may be a third subframe under the above configuration, namely, an uplink subframe under the second TDD configuration of the dynamic subframe TDD carrier.

The fourth uplink subframe is a subframe temporarily used for transmitting the downlink PDSCH data, and/or, the uplink subframe may carry the uplink ACK/NACK when not transmitting the downlink PDSCH data.

Step j3. Determine the second carrier where the ACK/NACK corresponding to the PDSCH is transmitted, where the second carrier is a carrier other than the TDD carrier, and specifically may be an FDD carrier or a TDD carrier.

Because the fourth uplink subframe is an uplink subframe on the conventional TDD carrier (non-dynamic subframe TDD carrier), or an uplink subframe under the second TDD configuration of the dynamic subframe TDD carrier, if downlink data transmission is scheduled in the fourth uplink subframe, namely, PDSCH transmission, according to the ACK/NACK timing relationship on the conventional TDD carrier or the ACK/NACK timing relationship on the dynamic subframe TDD carrier, namely, an ACK/NACK timing relationship under the second TDD configuration, the corresponding ACK/NACK corresponding to the PDSCH cannot be fed back. Therefore, the ACK/NACK corresponding to the PDSCH needs to be transmitted on other carriers.

If the number of carriers, except the current TDD carrier, configured for the UE is 1, the carrier for the ACK/NACK feedback is a carrier other than the current TDD carrier; if the number of carriers, except the current TDD carrier, configured for the UE is greater than 1, the UE may determine, among the carriers except the current TDD carrier by receiving layer-1 signaling or RRC signaling transmitted by the network-side device, that the second carrier is used for ACK/NACK feedback.

Step j4. Determine a second timing relationship of the ACK/NACK feedback corresponding to the PDSCH, and determine, according to the second timing relationship, the sixth subframe in which the ACK/NACK is fed back.

The UE may determine the second timing relationship through the second carrier, and specifically, may use the timing relationship between the PDSCH on the second carrier and the ACK/NACK as the second timing relationship.

The sequence of steps j3 and j4 may be interchanged, that is, the second timing relationship may be first determined, and then the second carrier and the sixth subframe for ACK/NACK feedback may be determined according to the second timing relationship. Specifically, the UE may determine the second timing relationship by receiving the layer-1 signaling or RRC signaling transmitted by the network-side device.

Step j5. In the sixth subframe of the second carrier, determine a second channel resource used for the UE to feed back the ACK/NACK.

Specifically, the ACK/NACK channel resource may be indicated in an implicit manner, for example, the ACK/

NACK channel resource may implicitly correspond to the identifier of the CCE occupied by the PDCCH. Thereby, the UE transmits the ACK/NACK, on an ACK/NACK channel resource corresponding to a CCE that is used by the network-side device to schedule the PDCCH, where the CCE may also be an enhanced CCE corresponding to an enhanced PDCCH; and the ACK/NACK channel resource may also be indicated explicitly through signaling, for example, one or a group of ACK/NACK channel resources is reserved through RRC signaling. If one ACK/NACK channel resource is reserved, the UE transmits, on the channel resource, the ACK/NACK. If a group of ACK/NACK channel resources is reserved, the UE further needs to dynamically determine, by receiving the PDCCH, which one resource in the group of ACK/NACK channel resources is used as a channel resource for the current ACK/NACK feedback; and correspondingly, the UE transmits, on the channel resource dynamically indicated, the ACK/NACK. Specifically, the channel resource may be determined by receiving a bit or scrambling code in the PDCCH.

Step j6. The UE transmits the ACK/NACK on the second channel resource in the sixth subframe of the second carrier.

For example:

It is assumed that the network-side device configures two carriers for the UE, where carrier 1 is an FDD carrier, and carrier 2 is a TDD carrier, where the TDD carrier is a conventional TDD carrier, namely, not using the dynamic subframe configuration; it is assumed that the uplink and downlink configuration of the TDD carrier is configuration 2, that is, configurations of 10 subframes of a radio frame are DSUDDDSUDD (DL DL UL DL DL DL DL UL DL DL), where S indicates a special subframe, and the subframe may transmit downlink data PDSCH but cannot transmit uplink PUSCH data and therefore may be used as a downlink subframe. The network-side device may schedule PDSCHs in the eight downlink subframes of the TDD carrier. The ACKs/NACKs corresponding to the PDSCHs may be transmitted on the uplink subframe of the TDD carrier, and may also be transmitted on the uplink subframe of the FDD carrier. In addition, the network-side device may schedule downlink PDSCH data in the uplink subframe of the TDD carrier. Correspondingly, if the uplink subframe of the TDD carrier is not used to feed back the uplink ACK/NACK, the UE needs to monitor PDCCH information in the uplink subframe. If the network-side device schedules downlink PDSCH data in the uplink subframe, because the uplink subframe of the current TDD carrier has only ACK/NACK feedback timing of the downlink subframe on the carrier, if the uplink subframe is used for downlink transmission, the current TDD carrier has no ACK/NACK timing of the downlink transmission. Therefore, the UE needs to determine the carrier carrying the ACK/NACK corresponding to the PDSCH, which may be specifically determined by the UE, or may also be allocated by the network-side device. The carrier that feeds back the ACK/NACK is a carrier other than the current TDD carrier.

Specifically, in the case that the UE determines the carrier, if the UE is configured with two carries, the UE may feed back the ACK/NACK on the other carrier than the carrier carrying the current PDSCH, where the other carrier may be an FDD carrier or a TDD carrier; if the other carrier is a TDD carrier, the subframe of the same time as the fourth uplink subframe of the current TDD carrier is a downlink subframe. Only this may ensure that uplink ACK/NACK timing of the downlink data transmission in the fourth uplink subframe exists on the other TDD carrier. If the other carrier is an FDD carrier, it may be definitely ensured that the uplink ACK/NACK timing of the downlink data transmission in the fourth uplink subframe exists, for example, the ACK/NACK may be fed back in the subframe of the FDD carrier after four subframes from the fourth uplink subframe.

In the case that the network-side device configures the carrier carrying the ACK/NACK corresponding to the PDSCH, assuming that the UE is configured with more than two carriers, the UE may feed back the ACK/NACK on other carriers according to the indication of the network-side device. The determination may be specifically performed according to layer-1 signaling or RRC signaling or the combination of layer-1 signaling and RRC signaling.

The timing relationship of the ACK/NACK feedback may be just the timing relationship on a selected carrier, namely, a timing relationship of the ACK/NACK feedback corresponding to the downlink subframe of the same time as the fourth uplink subframe on the selected carrier. The timing relationship may also be determined before the carrier that feeds back the ACK/NACK is determined, and specifically, may be determined by selecting a timing relationship that has the shortest delay, and then the carrier of the timing relationship is selected as the carrier for feeding back the ACK/NACK. That is, the sequence of determining the subframe for feeding back the ACK/NACK and determining the carrier carrying the ACK/NACK is not limited.

Then the UE needs to determine a channel resource used for ACK/NACK feedback, which may be specifically configured by the network-side device through layer-1 signaling or RRC signaling or the combination of the layer-1 signaling and RRC signaling, for example, allocated explicitly through a bit (such as an ARI) in the PDCCH and other manners, or allocated implicitly through a CCE identifier and other manners, or a group of ACK/NACK channel resources may be configured through RRC signaling, and then a bit in the PDCCH is used to determine one of the ACK/NACK channel resources.

In the case that the current TDD carrier uses a dynamic subframe configuration, assuming that the first TDD configuration of the TDD carrier notified by system information is configuration 0, that is, the subframe configuration is "DL DL UL UL UL DL DL UL UL UL", and that the timing relationship between the PDSCH of the carrier and the ACK/NACK is operated according to the second TDD configuration, the second TDD configuration is configured through RRC dedicated signaling. Specifically, the fourth and fifth subframes are uplink subframes according to the first TDD configuration, but may be used for downlink data transmission, and their corresponding uplink ACK/NACK feedback may be performed according to the second TDD configuration, that is, the feedback may be performed on the third or eighth subframe, that is, the two subframes are fixed uplink subframes, while the fourth, fifth, ninth, and tenth subframes may be understood as dynamic subframes.

In the present disclosure, it is assumed that a TDD carrier of a dynamic subframe and another carrier are configured, where the other carrier may be an FDD carrier or a TDD carrier. For the fixed uplink subframe of the current TDD carrier, for example, when the subframes 3 and 8 are used for downlink data transmission, their corresponding ACK/NACK feedback cannot be performed according to the timing relationship between the first TDD configuration and the second TDD configuration. Therefore, the ACK/NACK may be fed back on another FDD or TDD carrier, where a timing relationship on another carrier may be used as the timing relationship. The configuration of the second channel resource is consistent with the configuration in the above embodiment, and is not further described here.

The present disclosure further provides a network-side device. The network-side device may be a device in a TDD system, an FDD system, or a system where TDD and FDD carriers are aggregated.

Specifically, the network-side device may include the following:

A transmitting unit which is configured to transmit PDCCH information to a UE in a fifth subframe on a TDD carrier, where the PDCCH information indicates scheduling information of a PDSCH carried in a fourth uplink subframe; and indicate, to the UE, a second channel resource that is determined by a processing unit in a sixth subframe of a second carrier.

The relationship between the fifth subframe and the fourth uplink subframe, and the PDCCH information, are specifically described in the corresponding method embodiment above, and are not further described here.

The fourth uplink subframe may be specifically an uplink subframe under the second TDD configuration of the dynamic subframe TDD carrier, where the second TDD configuration is a TDD configuration that decides the timing relationship between the PDSCH on the TDD carrier and an ACK/NACK, and may be configured through RRC dedicated signaling.

The network-side device may also include the processing unit, which is configured to configure at least two carriers for the UE, where the carriers include at least one TDD carrier; determine a second carrier for the UE to transmit the ACK/NACK corresponding to the PDSCH, where the second carrier is a carrier other than the TDD carrier, and may be specifically an FDD carrier or a TDD carrier; determine a second timing relationship of the ACK/NACK feedback corresponding to the PDSCH, and determine, according to the second timing relationship, a sixth subframe for feeding back the ACK/NACK; and determine a second channel resource on the sixth subframe of the second carrier for the UE to feed back the ACK/NACK.

Methods for determining the second carrier, second timing relationship, sixth subframe, and second channel resource are described in the corresponding method embodiment above, and are not further described here.

The network-side device may also include a receiving unit, which is configured to receive the ACK/NACK transmitted by the UE on the second channel resource in the sixth subframe of the second carrier.

The processing unit may specifically include: a configuring unit, a carrier determining unit, a timing relationship and subframe determining unit, and a channel resource determining unit.

The configuring unit is configured to configure at least two carriers, where the carriers include at least one TDD carrier.

The carrier determining unit is configured to determine a second carrier used for the UE to transmit the ACK/NACK corresponding to the PDSCH.

The timing relationship and subframe determining unit is configured to determine the second timing relationship of the ACK/NACK feedback corresponding to the PDSCH, and determine, according to the second timing relationship, a sixth subframe for feeding back the ACK/NACK.

The channel resource determining unit is configured to: in the sixth subframe determined by the timing relationship and subframe determining unit, and on the second carrier determined by the carrier determining unit, determine a second channel resource used for the UE to feed back the ACK/NACK.

The processing method in the processing unit is described in the corresponding method embodiment above, and is not further described here.

The present disclosure further provides a user equipment. The user equipment may be a device in a TDD system, an FDD system, or a system where TDD and FDD carriers are aggregated.

Specifically, the user equipment may include the following:

A receiving unit, which is configured to receive PDCCH information in a fifth subframe on one TDD carrier, where the PDCCH information indicates scheduling information of a PDSCH carried in a fourth uplink subframe.

The relationship between the fifth subframe and the fourth uplink subframe, and the PDCCH information, are specifically described in the corresponding method embodiment above, and are not further described here.

The fourth uplink subframe may be specifically an uplink subframe under the second TDD configuration of the dynamic subframe TDD carrier, where the second TDD configuration is a TDD configuration that decides the timing relationship between the PDSCH on the TDD carrier and an ACK/NACK, and may be configured through RRC dedicated signaling.

The user equipment may also include a processing unit, which is configured for the UE to determine at least two carriers configured by the network-side device, where the carriers include at least one TDD carrier; determine a second carrier for transmitting the ACK/NACK corresponding to the PDSCH, where the second carrier is a carrier other than the TDD carrier, and may be specifically an FDD carrier or a TDD carrier; determine a second timing relationship of the ACK/NACK feedback corresponding to the PDSCH, and determine, according to the second timing relationship, a sixth subframe for feeding back the ACK/NACK; and determine a second channel resource on the sixth subframe of the second carrier for the UE to feed back the ACK/NACK.

Methods for determining the second carrier, second timing relationship, sixth subframe, and second channel resource are described in the corresponding method embodiment above, and are not further described here.

The user equipment may also include a transmitting unit, which is configured for the UE to transmit the ACK/NACK on the second channel resource in the sixth subframe of the second carrier which is determined by the processing unit.

The processing unit may specifically include: a configured carrier determining unit, an ACK/NACK feedback carrier determining unit, a timing relationship and subframe determining unit, and a channel resource determining unit.

The configured carrier determining unit is configured for the UE to determine at least two carriers configured by the network-side device, where the carriers include at least one TDD carrier.

The ACK/NACK feedback carrier determining unit is configured to determine a second carrier for transmitting the ACK/NACK corresponding to the PDSCH, where the second carrier is a carrier other than the TDD carrier, and may be specifically an FDD carrier or a TDD carrier.

The timing relationship and subframe determining unit is configured to determine the second timing relationship of the ACK/NACK feedback corresponding to the PDSCH, and determine, according to the second timing relationship, a sixth subframe for feeding back the ACK/NACK.

The channel resource determining unit is configured to: in the sixth subframe determined by the timing relationship and subframe determining unit, and on the second carrier determined by the ACK/NACK feedback carrier determining unit, determine a second channel resource used for the UE to feed back the ACK/NACK.

The processing method in the processing unit is described in the corresponding method embodiment above, and is not further described here.

Embodiment 3

Figure 7:
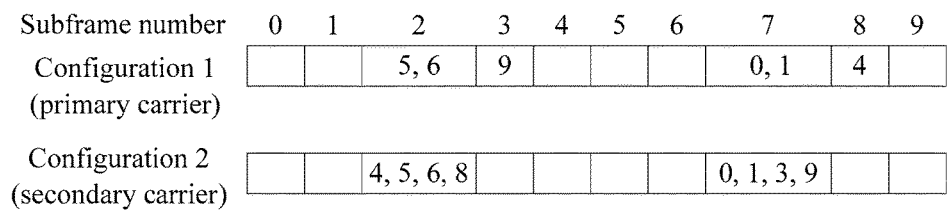
FIG. 7 is a schematic diagram of binding acknowledgement or negative acknowledgement time domain portions in aggregation of TDD carriers of different uplink and downlink configurations according to Embodiment 3 of the present disclosure.

In the prior art, when a PUCCH format 1b combined with an ACK/NACK feedback mode based on channel selection is used, if the number of ACK/NACK original bits or original bits after codeword binding is greater than 4, the number of ACK/NACK bits is reduced by binding the ACK/NACK time domain portions so that the number of ACK/NACK bits is not greater than 4. As shown in FIG. 7, it is assumed that in single-codeword transmission, the total number of ACK/NACK bits fed back by subframe 2 and subframe 7 is 6; using subframe 2 as an example, the ACKs/NACKs fed back by uplink subframe 2 in the Pcell, corresponding to downlink subframes 5 and 6, may be bound as 2 bits, and the ACKs/NACKs fed back by uplink subframe 2 in the Scell, corresponding to downlink subframes 4, 5, 6, and 8, may be bound as 2 bits, that is, 2 bits per carrier, and 4 ACK/NACK bits in total in subframes 2. Therefore, the PUCCH format 1b combined with an ACK/NACK feedback mode based on channel selection may be used. 2 bits bound with each carrier may be obtained according to Table 1, namely, the total number of ACKs after each carrier is bound. The specific mapping relationship is: the four states indicated by the 2 bits are respectively 00 (indicating that among bound ACKs/NACKs, at least one NACK exists), 10 (indicating that there is no NACK and that the number of ACKs is 1 or 4), 01 (indicating that there is no NACK and that the number of ACKs is 2), and 11 (indicating that there is no NACK and that the number of ACKs is 3). Another state is that if the UE finds that a PDCCH is undetected or that a PDCCH is not received, the UE does not transmit any ACK/NACK. The UE determines, according to a 2-bit DAI field in the PDCCH scheduled in bound several downlink subframes, whether a PDCCH is undetected, where the DAI count is accumulative based on each subframe. Using downlink subframes 4, 5, 6, and 8 of the Scell as examples, if the network-side device schedules the four downlink subframes, the corresponding DAI values in four PDCCHs are 1, 2, 3, and 4; if the UE receives only the PDCCHs whose DAIs are 1, 3, and 4, the UE determines that an eNB (base station) schedules downlink subframe 5 but the UE itself leaves the PDCCH undetected; therefore, the UE does not transmit any ACK/NACK. In addition, Table 1 shows only a mapping relationship, not excluding other similar mapping relationships.

TABLE 1

| Total Number of Bound ACKs | ACK/NACK State |
|---|---|
| 0 (at least one NACK) | 0, 0 |
| The UE finds that a PDCCH is undetected or that a PDCCH is not received | Not transmitted, not transmitted |
| 1 | 1, 0 |
| 2 | 0, 1 |
| 3 | 1, 1 |
| 4 | 1, 0 |
| 5 | 0, 1 |

TABLE 1-continued

| Total Number of Bound ACKs | ACK/NACK State |
|---|---|
| 6 | 1, 1 |
| 7 | 1, 0 |
| 8 | 0, 1 |
| 9 | 1, 1 |

As seen from the state "1, 0" fed back by the UE in Table 1, the state indicates that there is no NACK and that the number of ACKs is 1 or 4, and therefore an error occurs. Specifically, if the eNB schedules subframes 4, 5, 6, and 8 to the UE, but the UE receives only the PDCCH of subframe 4, where the DAI value is 1, and the UE obtains a PDCCH from the data scheduling. In this case, the UE does not find that the subsequent 3 PDCCHs are undetected, and therefore no NACK is not transmitted; therefore, the UE binds the ACK/NACK of the carrier to the state "1, 0" and feeds back the state to the eNB, indicating that the number of ACKs is 1. However, the eNB schedules four PDCCHs, and considers, when obtaining the "1, 0" fed back by the UE, that the number of ACKs fed back by the UE is 4. Therefore, the subsequent three data packets are lost. The error occurs because the state "1, 0" fed back by the UE is an overlapped state, namely, the state has two meanings.

To solve the problem of an ACK/NACK feedback information error caused by the conventional DAI counting mode, the DAI counting mode may be changed. Using the above case as an example, the DAI value may be not set to be greater than or equal to 4, and the present disclosure provides the following solution:

This embodiment provides a method for transmitting acknowledgement or negative acknowledgement indication information in a TDD system.

Figure 8:
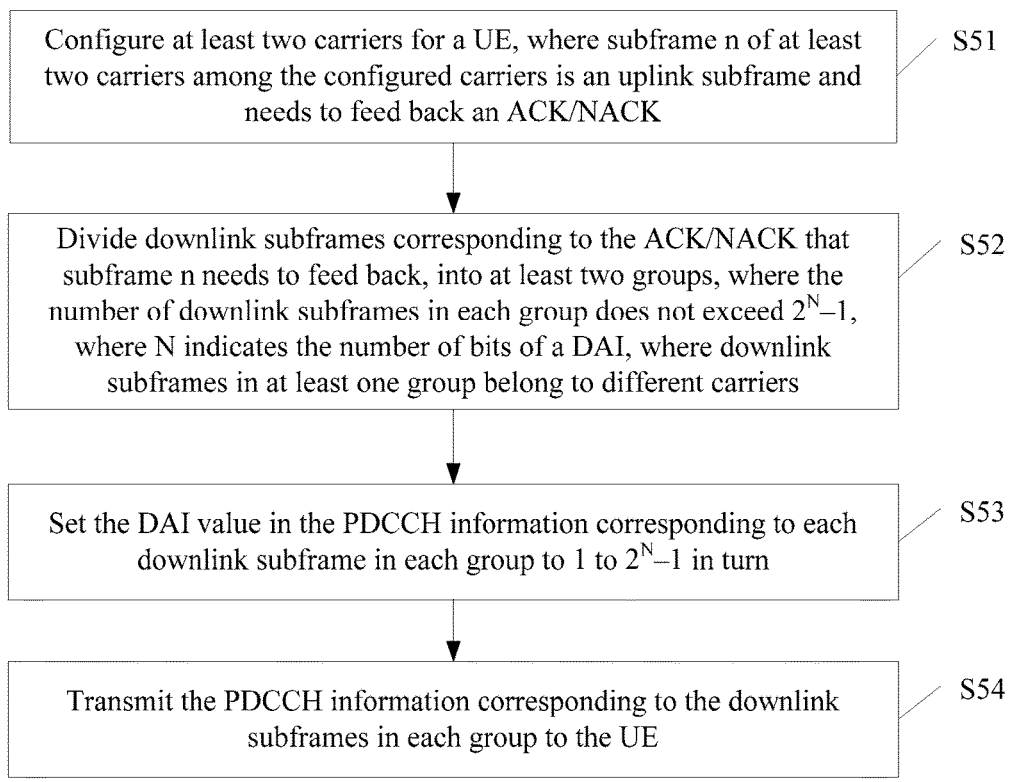
FIG. 8 is a flowchart of a method for transmitting acknowledgement or negative acknowledgement indication information in a TDD system according to Embodiment 3 of the present disclosure.

As shown in FIG. 8, this method may be executed by a network-side device, and specifically includes:

S51. Configure at least two carriers for a UE, where subframe n of at least two carriers among the configured carriers is an uplink subframe and needs to feed back an ACK/NACK.

S52. Divide downlink subframes corresponding to the ACK/NACK that subframe n needs to feed back, into at least two groups, where the number of downlink subframes in each group does not exceed $2^N-1$, where N indicates the number of bits of a DAI, where downlink subframes in at least one group belong to different carriers.

S53. Set the DAI value in the PDCCH information corresponding to each downlink subframe in each group to 1 to $2^N-1$ in turn.

S54. Transmit the PDCCH information corresponding to the downlink subframes in each group to the UE.

Specifically, if there are two carriers and subframes are divided into two groups, the dividing downlink subframes corresponding to the ACK/NACK that subframe n needs to feed back, into at least two groups, may include:

grouping downlink subframes whose transmission time is within the first $2^N-1$ subframes on the first carrier among the downlink subframes corresponding to the ACK/NACK, into a first group, where the $2^N-1$ downlink subframes are called a first group of subframes; and grouping other downlink subframes than the first group of subframes on the first carrier among the downlink subframes corresponding to the ACK/NACK, and downlink subframes on the second carrier among the downlink subframes corresponding to the ACK/NACK, into a second group, where the number of downlink subframes in the second group also does not exceed $2^N-1$.

The case of two carriers is described above; for three or more carriers, and/or three or more groups, the processing principle is similar, and therefore is not further described here.

Specifically, the setting the DAI value in the PDCCH information corresponding to each downlink subframe in each group to 1 to $2^N-1$ in turn may include:

in each of the groups, setting the DAI values from 1 to $2^N-1$ in turn according to the transmission time sequence of the PDCCH information, where the DAI values are set again according to the carrier sequence for at least two downlink subframes of the same transmission time. Of course, the setting of the DAI value may also use other manners, for example, use the setting sequence learnt by both the network-side device and the UE.

Figure 9:
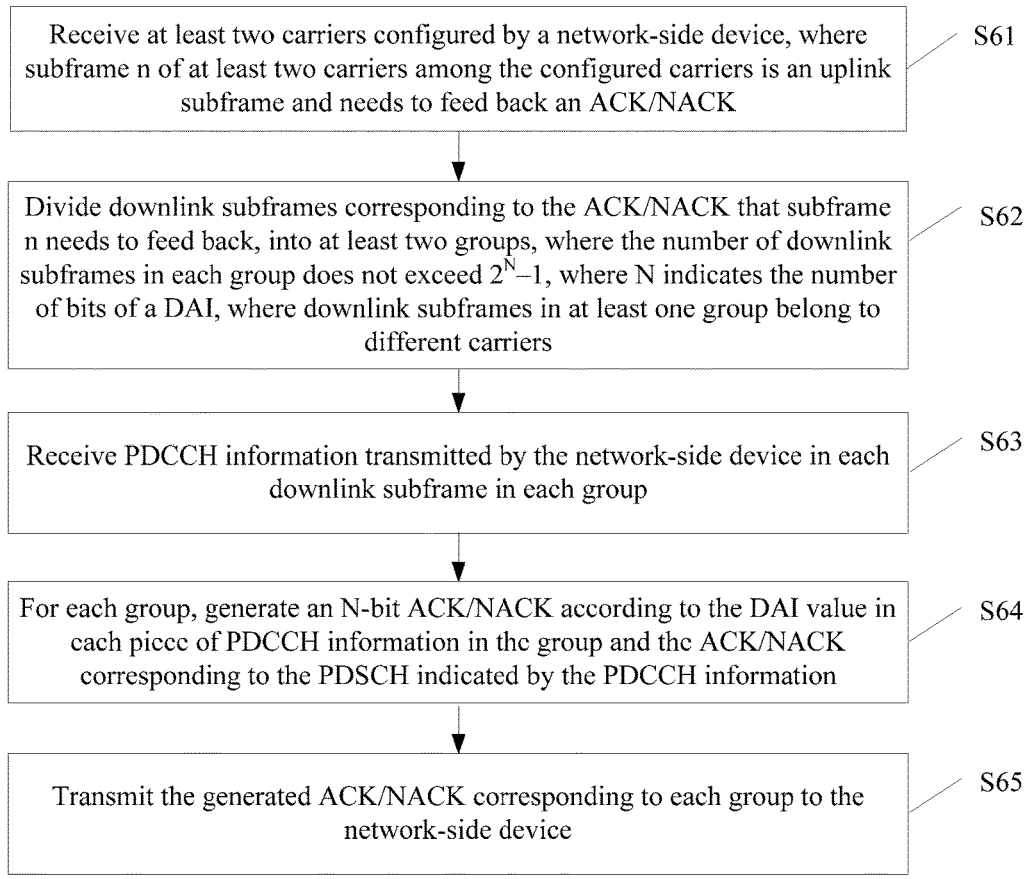
FIG. 9 is a flowchart of a method for transmitting acknowledgement or negative acknowledgement indication information in a TDD system according to Embodiment 3 of the present disclosure.

As shown in FIG. 9, this method may be executed by a user equipment, and specifically includes:

S61. Receive at least two carriers configured by a network-side device, where subframe n of at least two carriers among the configured carriers is an uplink subframe and needs to feed back an ACK/NACK.

S62. Divide downlink subframes corresponding to the ACK/NACK that subframe n needs to feed back, into at least two groups, where the number of downlink subframes in each group does not exceed $2^N-1$, where N indicates the number of bits of a DAI, where downlink subframes in at least one group belong to different carriers.

S63. Receive PDCCH information transmitted by the network-side device in each downlink subframe in each group.

S64. For each group, generate an N-bit ACK/NACK according to the DAI value in each piece of PDCCH information in the group and the ACK/NACK corresponding to the PDSCH indicated by the PDCCH information.

S65. Transmit the generated ACK/NACK corresponding to each group to the network-side device.

According to the method provided by this embodiment, when the number N of bits of the DAI is 2, the state indication of the DAI when some of the ACKs/NACKs are bound is shown in Table 2. As seen from Table 2, because the DAI counting manner is changed, the ACK/NACK feedback information (namely, the ACK/NACK state) has no overlapped state.

TABLE 2

| Total Number of Bound ACKs | ACK/NACK State |
| --- | --- |
| 0 (at least one NACK) | 0, 0 |
| The UE finds that a PDCCH is undetected or that a PDCCH is not received | Not transmitted, not transmitted |
| 1 | 1, 0 |
| 2 | 0, 1 |
| 3 | 1, 1 |

The following uses subframe 2 in FIG. 7 as an example to describe the solution of this embodiment in combination with Table 2.

First, two carriers Pcell and Scell are configured for the UE, and subframe 2 is an uplink subframe on both the two carriers and needs to feed back ACKs/NACKs; 6 downlink subframes of two carriers corresponding to the ACKs/NACKs that uplink subframe 2 needs to feed back are divided into two groups, where the number of downlink subframes included in each group is 3; the first group is downlink subframes 4, 5, and 6 of the Scell, and the second group is downlink subframes 5 and 6 of the Pcell and downlink subframe 8 of the Scell, and the second group crosses different carriers. For downlink subframes 4, 5, and 6 of the first group, the DAI counts are 1, 2, and 3, respectively. For the downlink subframes 5, 6, and 8 of the second group, the DAI counts are 1, 2, and 3, respectively. Therefore, the case that the DAI is 4 may not occur, that is, the UE may not feed back that the number of ACKs is 4. Thereby, an error caused by the overlapped state is avoided.

This embodiment avoids the ACK/NACK feedback information error by changing the DAI counting manner to avoid overlapping of the ACK/NACK feedback information.

Embodiment 4

Figure 10:
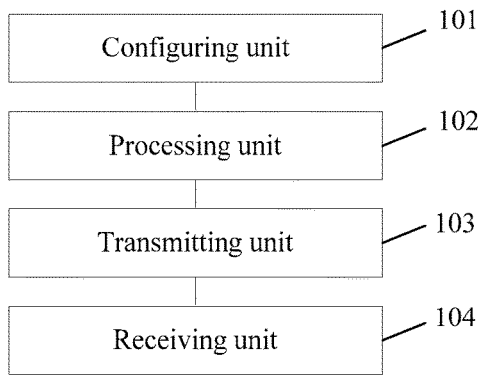
FIG. 10 is a schematic structural diagram of a network-side device according to Embodiment 4 of the present disclosure.

As shown in FIG. 10, this embodiment provides a network-side device. The network-side device includes:

a configuring unit 101, configured to configure at least two carriers for a user equipment UE, where the carriers include one primary carrier and at least one secondary carrier;

a processing unit 102, configured to generate physical downlink control channel PDCCH information for the UE, where the PDCCH information indicates scheduling information of a physical downlink shared channel PDSCH carried in a downlink subframe; the PDCCH information indicates an acknowledgement ACK or negative acknowledgement NACK channel resource corresponding to the PDSCH, where the ACK/NACK channel resource is carried in a first uplink subframe on the secondary carrier configured by the configuring unit 101, where the first uplink subframe is determined according to a timing relationship between the PDSCH and the ACK/NACK corresponding to the PDSCH, and a subframe of the same time as the first uplink subframe is a downlink subframe on the primary carrier configured by the configuring unit 101;

a transmitting unit 103, configured to transmit the PDCCH information generated by the processing unit 102 to the UE in a downlink subframe; and a receiving unit 104, configured to receive, in the first uplink subframe of the secondary carrier where the ACK/NACK channel resource indicated by the PDCCH information transmitted by the transmitting unit 103 is located, the ACK/NACK fed back by the UE.

A subframe of the same time as the first uplink subframe is an uplink subframe on the first secondary carrier.

If there is one secondary carrier, the ACK/NACK channel resource indicated by the PDCCH information generated by the processing unit 102 is carried in the first uplink subframe of the first secondary carrier;

and/or, if there are two or more first secondary carriers, the ACK/NACK channel resource indicated by the PDCCH information generated by the processing unit 102 is carried in the first uplink subframe of a secondary carrier among the first secondary carriers, where the one secondary carrier among the first secondary carriers is one of the following secondary carriers:

a secondary carrier of the highest priority, a secondary carrier of the lightest load, a secondary carrier of the lowest frequency, a secondary carrier of the minimum index value, and a secondary carrier configured by the network-side device for the UE through signaling.

If there are two or more first secondary carriers, and the ACK/NACK channel resource indicated by the PDCCH information generated by the processing unit 102 is carried in the first uplink subframe of a secondary carrier of the highest priority among the first secondary carriers, the processing unit 102 is further configured to:

determine priorities of secondary carriers among the first secondary carriers, including: according to the load of the ACK/NACK corresponding to the first uplink subframe on each secondary carrier where the first uplink subframe is an uplink subframe, or the frequency of each secondary carrier, or the index configuration of each secondary carrier, so that the ACK/NACK channel resource indicated by the PDCCH information generated by the processing unit 102 is carried in the first uplink subframe of the secondary carrier of the highest priority among the first secondary carriers;

or, the processing unit 102 is further configured to:

determine priorities for secondary carriers configured for the UE, where the determining specifically includes: for each time, determining priorities for all secondary carriers where a subframe corresponding to the time is an uplink subframe; and determine priorities of secondary carriers among the first secondary carriers, where the determining specifically includes: obtaining priorities of all secondary carriers where a subframe corresponding to the time of the first uplink subframe is an uplink subframe, so that the ACK/NACK channel resource indicated by the PDCCH information generated by the processing unit 102 is carried in the first uplink subframe of the secondary carrier of the highest priority among the first secondary carriers.

The transmitting unit 103 is further configured to: after determining that the ACK/NACK channel resource corresponding to the PDSCH is located on the secondary carrier, transmit information about the determined secondary carrier to the UE through PDCCH information.

On the network-side device, only one secondary carrier is scheduled for the UE and no primary carrier is scheduled, where the secondary carrier is a second secondary carrier, and the ACK/NACK channel resource indicated by the PDCCH information generated by the processing unit 102 is carried in the first uplink subframe of the second secondary carrier.

The identifier of the control channel element CCE occupied by the PDCCH corresponds to the ACK/NACK channel resource;

the indicating, by the PDCCH information generated by the processing unit 102, scheduling information of a physical downlink shared channel PDSCH that is carried by the downlink subframe, includes:

indicating the ACK/NACK channel resource by using the identifier of a CCE among the CCEs occupied by the PDCCH.

The network-side device further includes:

a reserving unit, configured to reserve, through radio resource control RRC dedicated signaling, an ACK/NACK resource set for the UE in a subframe used for ACK/NACK feedback, where at least one ACK/NACK channel resource included in the ACK/NACK resource set is located on one or multiple secondary carriers, and each ACK/NACK channel resource in the ACK/NACK resource set is carried on a unique secondary carrier;

the indicating, by the PDCCH information generated by the processing unit 102, the ACK/NACK channel resource corresponding to the PDSCH, includes:

using the transmit power control TPC or downlink assignment index DAI in the PDCCH information transmitted to the UE as an ACK/NACK channel resource indicator ARI, where the ARI is used to indicate an ACK/NACK channel resource that is included in the ACK/NACK resource set and used for the UE to feed back the ACK/NACK, and the carrier carrying the ACK/NACK channel resource is a carrier used for the UE to feed back the ACK/NACK.

Using the TPC in the PDCCH information generated by the processing unit 102 as an ARI, includes:

selecting one of the secondary carriers where the first uplink subframe corresponds to an uplink subframe, as a third secondary carrier;

scheduling a TPC command word in the PDCCH information corresponding to the PDSCH carried on the third carrier as a TPC command word; and scheduling a TPC command word in the PDCCH information corresponding to other PDSCHs as an ARI, where the other PDSCHs are carried on one or multiple secondary carriers among other secondary carriers than the third secondary carrier, and the ARI values are the same when the other PDSCHs are carried on multiple secondary carriers.

The processing unit 102 is further configured to:

determine priorities for secondary carriers configured for the UE, where the determining includes: for each time, determining priorities for all secondary carriers where a subframe corresponding to the time is an uplink subframe; and the third secondary carrier is a secondary carrier of the highest priority among the secondary carriers where the first uplink subframe corresponds to an uplink subframe.

The determining, by the processing unit 102, priorities for all secondary carriers where a subframe corresponding to the time is an uplink subframe, includes:

according to the load of the ACK/NACK on each secondary carrier where the subframe is an uplink subframe, or the frequency of each secondary carrier, or the index configuration of each secondary carrier.

In brief, the network-side device provided by this embodiment may include:

a configuring unit, configured to configure at least two carriers for a user equipment UE, where the carriers include one primary carrier and at least one secondary carrier;

a processing unit, configured to generate physical downlink control channel PDCCH information for the UE, where the PDCCH information indicates scheduling information of a physical downlink shared channel PDSCH carried in a downlink subframe; the PDCCH information indicates an acknowledgement ACK or negative acknowledgement NACK channel resource corresponding to the PDSCH, where the ACK/NACK channel resource is carried in a first uplink subframe on the secondary carrier configured by the configuring unit, where the first uplink subframe is determined according to a timing relationship between the PDSCH and the ACK/NACK corresponding to the PDSCH, and a subframe of the same time as the first uplink subframe is a downlink subframe on the primary carrier configured by the configuring unit;

a transmitting unit, configured to transmit the PDCCH information generated by the processing unit to the UE in a downlink subframe; and a receiving unit, configured to receive, in the first uplink subframe of the secondary carrier where the ACK/NACK channel resource indicated by the PDCCH information transmitted by the transmitting unit is located, the ACK/NACK fed back by the UE.

A subframe of the same time as the first uplink subframe is an uplink subframe on the first secondary carrier.

If there is one first secondary carrier, the ACK/NACK channel resource indicated by the PDCCH information generated by the processing unit is carried in the first uplink subframe of the first secondary carrier;

and/or, if there are two or more first secondary carriers, the ACK/NACK channel resource indicated by the PDCCH information generated by the processing unit is carried in the first uplink subframe of one secondary carrier among the first secondary carriers, where the one secondary carrier among the first secondary carriers is one of the following secondary carriers:

a secondary carrier of the highest priority, a secondary carrier of the lightest load, a secondary carrier of the lowest frequency, a secondary carrier of the minimum index value, and a secondary carrier configured by the network-side device for the UE through signaling.

Correspondingly, if there are two or more first secondary carriers, and the ACK/NACK channel resource indicated by the PDCCH information generated by the processing unit is carried in the first uplink subframe of the secondary carrier of the highest priority among the first secondary carriers, the processing unit is further configured to:

determine priorities of secondary carriers among the first secondary carriers, including: according to the load of the ACK/NACK corresponding to the first uplink subframe on each secondary carrier where the first uplink subframe is an uplink subframe, or the frequency of each secondary carrier, or the index configuration of each secondary carrier, so that the ACK/NACK channel resource indicated by the PDCCH information generated by the processing unit is carried in the first uplink subframe of the secondary carrier of the highest priority among the first secondary carriers;

or, configured to:

determine priorities for secondary carriers configured for the UE, where the determining includes: for each time, determining priorities for all secondary carriers where a subframe corresponding to the time is an uplink subframe; and determine priorities of secondary carriers among the first secondary carriers, where the determining specifically includes: obtaining priorities of all secondary carriers where a subframe corresponding to the time of the first uplink subframe is an uplink subframe, so that the ACK/NACK channel resource indicated by the PDCCH information generated by the processing unit is carried in the first uplink subframe of the secondary carrier of the highest priority among the first secondary carriers.

The transmitting unit is further configured to: after determining that the ACK/NACK channel resource corresponding to the PDSCH is located on the secondary carrier, transmit information about the determined secondary carrier to the UE through the PDCCH information.

On the network-side device, only one secondary carrier is scheduled for the UE and no primary carrier is scheduled, where the secondary carrier is a second secondary carrier, and the ACK/NACK channel resource indicated by the PDCCH information generated by the processing unit is carried in the first uplink subframe of the second secondary carrier.

The identifier of the control channel element CCE occupied by the PDCCH corresponds to the ACK/NACK channel resource;

the indicating, by the PDCCH information generated by the processing unit, scheduling information of a physical downlink shared channel PDSCH that is carried by the downlink subframe, includes:

indicating the ACK/NACK channel resource by using the identifier of a CCE among the CCEs occupied by the PDCCH.

The network-side device further includes:

a reserving unit, configured to reserve, through radio resource control RRC dedicated signaling, an ACK/NACK resource set for the UE in a subframe used for ACK/NACK feedback, where at least one ACK/NACK channel resource included in the ACK/NACK resource set is located on one or multiple secondary carriers, and each ACK/NACK channel resource in the ACK/NACK resource set is carried on a unique secondary carrier;

the indicating, by the PDCCH information generated by the processing unit, the ACK/NACK channel resource corresponding to the PDSCH, includes:

using the transmit power control TPC or downlink assignment index DAI in the PDCCH information transmitted to the UE as an ACK/NACK channel resource indicator ARI, where the ARI is used to indicate an ACK/NACK channel resource that is included in the ACK/NACK resource set and used for the UE to feed back the ACK/NACK, and the carrier carrying the ACK/NACK channel resource is a carrier used for the UE to feed back the ACK/NACK.

Correspondingly, the using the TPC in the PDCCH information generated by the processing unit as an ARI, includes:

selecting one of the secondary carriers where the first uplink subframe corresponds to an uplink subframe, as a third secondary carrier;

scheduling a TPC command word in the PDCCH information corresponding to the PDSCH carried on the third carrier as a TPC command word; and scheduling a TPC command word in the PDCCH information corresponding to other PDSCHs as an ARI, where the other PDSCHs are carried on one or multiple secondary carriers among other secondary carriers than the third secondary carrier, and the ARI values are the same when the other PDSCHs are carried on multiple secondary carriers.

Correspondingly, the processing unit is further configured to:

determine priorities for secondary carriers configured for the UE, where the determining includes: for each time, determining priorities for all secondary carriers where a subframe corresponding to the time is an uplink subframe;

the third secondary carrier is a secondary carrier of the highest priority among the secondary carriers where the first uplink subframe corresponds to an uplink subframe.

Correspondingly, the determining, by the processing unit, priorities for all secondary carriers where a subframe corresponding to the time is an uplink subframe, includes:

according to the load of the ACK/NACK on each secondary carrier where the subframe is an uplink subframe, or the frequency of each secondary carrier, or the index configuration of each secondary carrier.

The network-side device provided by this embodiment indicates, through PDCCH information, that the ACK/NACK channel resource corresponding to the PDSCH is carried in the first uplink subframe on the secondary carrier and that a subframe of the same time as the first uplink subframe is a downlink subframe on the primary carrier, so that the UE feeds back, on the ACK/NACK channel resource in the first uplink subframe of the determined secondary carrier, the ACK/NACK corresponding to the PDSCH, so that the ACK/NACK can also be fed back when carriers of different uplink and downlink subframe configurations are aggregated.

Embodiment 5

Figure 11:
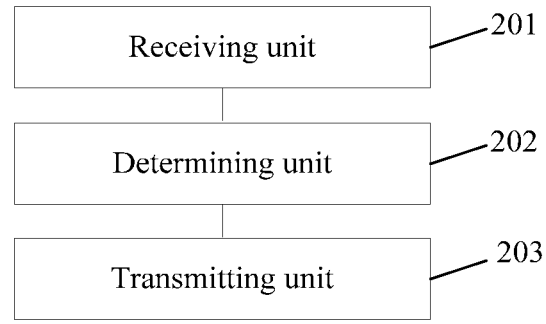
FIG. 11 is a schematic structural diagram of a user equipment according to Embodiment 5 of the present disclosure.

As shown in FIG. 11, this embodiment provides a user equipment UE, where the UE includes:

a receiving unit 201, configured to receive physical downlink control channel PDCCH information transmitted by a network-side device to the UE in a downlink subframe;

a determining unit 202, configured to determine, according to scheduling information carried in the PDCCH information received by the receiving unit 201, a physical downlink shared channel PDSCH scheduled by the PDCCH information; determine, according to the PDCCH information, an acknowledgement ACK or negative acknowledgement NACK channel resource corresponding to the PDSCH; determine, according to a timing relationships between the PDSCH and the ACK/NACK corresponding to the PDSCH, a first uplink subframe used for feeding back the ACK/NACK, where a subframe of the same time as the first uplink subframe is a downlink subframe on a primary carrier; and determine a secondary carrier carrying the ACK/NACK channel resource; and a transmitting unit 203, configured to feed back, on the ACK/NACK channel resource determined by the determining unit 202, the ACK/NACK corresponding to the PDSCH, where the ACK/NACK channel resource is located in a first uplink subframe of the determined secondary carrier.

The receiving unit 201 is further configured to receive radio resource control RRC dedicated signaling transmitted by the network-side device;

the determining unit 202 is further configured to obtain, according to the RRC dedicated signaling received by the receiving unit 201, an ACK/NACK resource set that is reserved by the network-side device for the UE in a subframe used for ACK/NACK feedback, where at least one ACK/NACK channel resource included in the ACK/NACK resource set is located on one or multiple secondary carriers, and each ACK/NACK channel resource in the ACK/NACK resource set is carried on a unique secondary carrier; and the determining, by the determining unit 202 according to the PDCCH information, an ACK/NACK channel resource corresponding to the PDSCH, includes:

obtaining, by the determining unit 202, the transmit power control TPC or downlink assignment index DAI that is included in the PDCCH information transmitted by the network-side device and is used as an ACK/NACK channel resource indicator ARI, and determining, according to the ARI, an ACK/NACK channel resource that is included in the ACK/NACK resource set and is used for the UE to feed back the ACK/NACK, where the carrier carrying the ACK/NACK channel resource is a carrier used for the UE to feed back the ACK/NACK.

The obtaining, by the determining unit 202, the TPC or DAI that is used as the ACK/NACK channel resource indicator ARI, includes:

selecting one of the secondary carriers where the first uplink subframe corresponds to an uplink subframe, as a third secondary carrier;

using a TPC command word in the PDCCH information corresponding to the PDSCH carried on the third carrier as a TPC command word; and using a TPC command word in the PDCCH information corresponding to other PDSCHs as an ARI, where the other PDSCHs are carried on one or multiple secondary carriers among other secondary carriers than the third secondary carrier, and the ARI values are the same when the other PDSCHs are carried on multiple secondary carriers.

A subframe of the same time as the first uplink subframe is an uplink subframe on the first secondary carrier.

If there is one first secondary carrier, the determining, by the determining unit 202, the secondary carrier carrying the ACK/NACK channel resource, includes:

determining the secondary carrier carrying the ACK/NACK channel resource as a first secondary carrier;

and/or, if there are two or more first secondary carriers, the determining a secondary carrier carrying the ACK/NACK channel resource includes: determining the secondary carrier carrying the ACK/NACK channel resource as one secondary carrier among the first secondary carriers;

the one secondary carrier among the first secondary carriers is one of the following secondary carriers:

a secondary carrier of the highest priority, a secondary carrier of the lightest load, a secondary carrier of the lowest frequency, a secondary carrier of the minimum index value, and a secondary carrier configured by the network-side device for the UE through signaling.

If there are two or more first secondary carriers, and the secondary carrier carrying the ACK/NACK channel resource is a secondary carrier of the highest priority among the first secondary carriers, the determining unit 202 is further configured to:

determine priorities of secondary carriers among the first secondary carriers according to the load of the ACK/NACK corresponding to the first uplink subframe on each secondary carrier where the first uplink subframe is an uplink subframe, or the frequency of each secondary carrier, or the index configuration of each secondary carrier;

or, determine priorities for secondary carriers configured for the UE, where the determining specifically includes: for each time, determining priorities for all secondary carriers where a subframe corresponding to the time is an uplink subframe; and determine priorities of secondary carriers among the first secondary carriers, where the determining specifically includes: obtaining priorities of all secondary carriers where a subframe corresponding to the time of the first uplink subframe is an uplink frame.

The determining, by the determining unit 202, a secondary carrier carrying the ACK/NACK channel resource, includes:

if the network-side device schedules only one secondary carrier and does not schedule a primary carrier for the UE, and the secondary carrier is a second secondary carrier, determining, by the determining unit 202, the second secondary carrier as the secondary carrier carrying the ACK/NACK channel resource.

The identifier of the control channel element CCE occupied by the PDCCH corresponds to the ACK/NACK channel resource;

the determining, by the determining unit 202 according to the PDCCH information, an ACK/NACK channel resource corresponding to the PDSCH, includes:

determining, the ACK/NACK channel resource by using the identifier of a CCE among the CCEs occupied by the PDCCH.

In brief, the user equipment UE provided by this embodiment may specifically include:

a receiving unit, configured to receive physical downlink control channel PDCCH information transmitted by a network-side device to the UE in a downlink subframe;

a determining unit, configured to determine, according to scheduling information carried in the PDCCH information, a physical downlink shared channel PDSCH scheduled by the PDCCH information; determine, according to the PDCCH information, an acknowledgement ACK or negative acknowledgement NACK channel resource corresponding to the PDSCH; determine, according to a timing relationship between the PDSCH and the ACK/NACK corresponding to the PDSCH, a first uplink subframe used for feeding back the ACK/NACK, where a subframe of the same time as the first uplink subframe is a downlink subframe on a primary carrier; and determine a secondary carrier carrying the ACK/NACK channel resource; and a transmitting unit, configured to feed back, on the ACK/NACK channel resource determined by the determining unit, the ACK/NACK corresponding to the PDSCH, where the ACK/NACK channel resource is located in a first uplink subframe of the determined secondary carrier.

The receiving unit is further configured to receive radio resource control RRC dedicated signaling transmitted by the network-side device;

the determining unit is further configured to obtain, according to the RRC dedicated signaling received by the receiving unit, an ACK/NACK resource set that is reserved by the network-side device for the UE in a subframe used for ACK/NACK feedback, where at least one ACK/NACK channel resource included in the ACK/NACK resource set is located on one or multiple secondary carriers, and each ACK/NACK channel resource in the ACK/NACK resource set is carried on a unique secondary carrier; and the determining, by the determining unit according to the PDCCH information, the ACK/NACK channel resource corresponding to the PDSCH, includes:

obtaining, by the determining unit, the transmit power control TPC or downlink assignment index DAI that is included in the PDCCH information transmitted by the network-side device and is used as an ACK/NACK channel resource indicator ARI, and determining, in the ACK/NACK resource set according to the ARI, the ACK/NACK channel resource used for the UE to feed back the ACK/NACK, where the carrier carrying the ACK/NACK channel resource is a carrier used for the UE to feed back the ACK/NACK.

Correspondingly, the obtaining, by the determining unit, the TPC or DAI that is used as the ACK/NACK channel resource indicator ARI, includes:

selecting one of the secondary carriers where the first uplink subframe corresponds to an uplink subframe, as a third secondary carrier;

using a TPC command word in the PDCCH information corresponding to the PDSCH carried on the third carrier as a TPC command word; and using a TPC command word in the PDCCH information corresponding to other PDSCHs as an ARI, where the other PDSCHs are carried on one or multiple secondary carriers among other secondary carriers than the third secondary carrier, and the ARI values are the same when the other PDSCHs are carried on multiple secondary carriers.

A subframe of the same time as the first uplink subframe is an uplink subframe on the first secondary carrier.

If there is one first secondary carrier, the determining, by the determining unit, the secondary carrier carrying the ACK/NACK channel resource, includes:

determining the secondary carrier carrying the ACK/NACK channel resource as the first secondary carrier; and/or, if there are two or more first secondary carriers, the determining a secondary carrier carrying the ACK/NACK channel resource includes: determining the secondary carrier carrying the ACK/NACK channel resource as one first secondary carrier among the first secondary carriers, where the one secondary carrier among the first secondary carriers is one of the following secondary carriers:

a secondary carrier of the highest priority, a secondary carrier of the lightest load, a secondary carrier of the lowest frequency, a secondary carrier of the minimum index value, and a secondary carrier configured by the network-side device for the UE through signaling.

Correspondingly, if there are two or more first secondary carriers, and the secondary carrier carrying the ACK/NACK channel resource is a secondary carrier of the highest priority among the first secondary carriers, the determining unit is further configured to:

determine priorities of secondary carriers among the first secondary carriers according to the load of the ACK/NACK corresponding to the first uplink subframe on each secondary carrier where the first uplink subframe is an uplink subframe, or the frequency of each secondary carrier, or the index configuration of each secondary carrier;

or, determine priorities for secondary carriers configured for the UE, where the determining specifically includes: for each time, determining priorities for all secondary carriers where a subframe corresponding to the time is an uplink subframe; and determining priorities of secondary carriers among the first secondary carriers, where the determining specifically includes: obtaining priorities of all secondary carriers where a subframe corresponding to the time of the first uplink subframe is an uplink subframe.

The determining, by the determining unit, a secondary carrier carrying the ACK/NACK channel resource, includes:

if the network-side device schedules only one secondary carrier and does not schedule a primary carrier for the UE, and the secondary carrier is a second secondary carrier, determining, by the determining unit, the second secondary carrier as the secondary carrier carrying the ACK/NACK channel resource.

Correspondingly, the identifier of the control channel element CCE occupied by the PDCCH corresponds to the ACK/NACK channel resource;

the determining, by the determining unit according to the PDCCH information, the ACK/NACK channel resource corresponding to the PDSCH, includes:

determining the ACK/NACK channel resource by using the identifier of a CCE among the CCEs occupied by the PDCCH.

The UE provided by this embodiment receives PDCCH information transmitted by a network-side device to the UE in a downlink subframe; determines, according to scheduling information carried in the PDCCH information, a PDSCH scheduled by the PDCCH information; determines, according to the indication of the PDCCH information, an ACK/NACK channel resource corresponding to the PDSCH; determines, according to a timing relationship between the PDSCH and the ACK/NACK corresponding to the PDSCH, a first uplink subframe used for feeding back the ACK/NACK, where a subframe of the same time as the first uplink subframe is a downlink subframe on a primary carrier; and determines a secondary carrier carrying the ACK/NACK channel resource; and feeds back, on the determined ACK/NACK channel resource, the ACK/NACK corresponding to the PDSCH, where the ACK/NACK channel resource is located in a first uplink subframe of the determined secondary carrier, so that the ACK/NACK can also be fed back when carriers of different uplink and downlink subframe configurations are aggregated.

Embodiment 6

Figure 12:
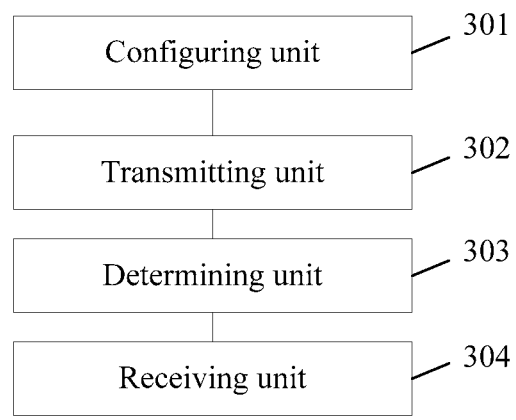
FIG. 12 is a schematic structural diagram of a network-side device according to Embodiment 6 of the present disclosure.

As shown in FIG. 12, this embodiment provides a network-side device, including:

a configuring unit 301, configured to configure at least two carriers for a UE, where the carriers include one primary carrier and at least one secondary carrier;

a transmitting unit 302, configured to transmit PDCCH information to the UE in a downlink subframe, where the PDCCH information indicates scheduling information of a PDSCH carried in a downlink subframe; and a determining unit 303, configured to determine at least two different ACK/NACK channel resources according to at least two timing relationships between the PDSCH indicated by the PDCCH information transmitted by the transmitting unit 302 and the ACK/NACK corresponding to the PDSCH, and determine a first channel resource from the at least two different ACK/NACK channel resources and use the first channel resource for the UE to feed back the ACK/NACK; where the transmitting unit 302 is further configured to notify the UE of the first channel resource determined by the determining unit 303 through signaling;

a receiving unit 304, configured to receive the ACK/NACK fed back by the UE on the first channel resource determined by the determining unit 303.

The at least two timing relationships at least include timing relationships that correspond to different carriers and/or correspond to different uplink subframes on a same carrier.

The at least two different ACK/NACK channel resources include: ACK/NACK channel resources carried in uplink subframes of different carriers at the same time, and/or, ACK/NACK channel resources in different uplink subframes. Specifically, the ACK/NACK channel resources in different uplink subframes may be different uplink subframes on different carriers or different uplink subframes on a same carrier.

The determining, by the determining unit 303, a first channel resource from the at least two different ACK/NACK channel resources, includes:

selecting, according to loads of at least two different ACK/NACK channel resources, an ACK/NACK channel resource that has a lightest load, as a first channel resource;

or, selecting, according to delays of at least two different ACK/NACK channel resources, an ACK/NACK channel resource that has a shortest delay, as a first channel resource;

or, determining, according to loads and delays of at least two different ACK/NACK channel resources, a first channel resource from the at least two different ACK/NACK channel resources.

The notifying, by the transmitting unit 302, the UE of the first channel resource through signaling, includes one of the following:

notifying the UE of information about the first channel resource through an added bit of the PDCCH information, a TPC, or a DAI;

determining, according to a mapping relationship between a scrambling code and the ACK/NACK channel resource, a first scrambling code corresponding to the first channel resource, and notifying the UE of the first scrambling code through PDCCH information; and determining, according to a mapping relationship between a PDCCH time-frequency resource position and the ACK/NACK channel resource, a first PDCCH time-frequency resource position corresponding to the first channel resource, and notifying the UE of the first PDCCH time-frequency resource position through PDCCH information.

The network-side device provided by this embodiment configures at least two carriers for the UE, where the carriers includes one primary carrier and at least one secondary carrier; transmits PDCCH information to the UE in a downlink subframe, where the PDCCH information indicates scheduling information of a PDSCH carried by a downlink subframe; determines at least two different ACK/NACK channel resources according to at least two timing relationships between the PDSCH and the ACK/NACK corresponding to the PDSCH; determines a first channel resource from the at least two different ACK/NACK channel resources and uses the first channel resource for the UE to feed back the ACK/NACK; notifies the UE of the first channel resource through signaling; and receives the ACK/NACK fed back by the UE on the first channel resource. Therefore, the ACK/NACK can also be fed back when carriers of different uplink and downlink subframe configurations are aggregated. In addition, the loads of ACKs/NACKs on carriers may be balanced, and the ACK/NACK feedback delay may be reduced.

The embodiment of the present disclosure further provides another network-side device. The implementation solution of the network-side device is similar to the solution shown in FIG. 16, where the network-side device may be a device in a TDD system, an FDD system, or a system where TDD and FDD carriers are aggregated.

Figure 18:
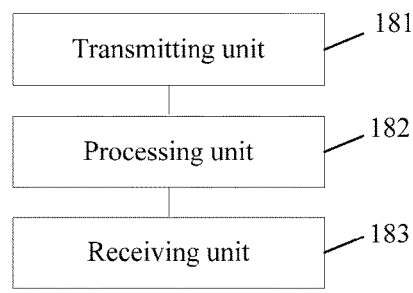
FIG. 18 is a schematic structural diagram of another network-side device according to Embodiment 6 of the present disclosure.

Specifically, as shown in FIG. 18, the network-side device may include:

A transmitting unit 181 is configured to notify a UE of carriers configured by a processing unit 182; transmit PDCCH information to the UE in a first subframe, where the PDCCH information indicates scheduling information of a PDSCH carried in a second downlink subframe; and indicate, to the UE, related information corresponding to a third uplink subframe and a first carrier that are determined by the processing unit and a first channel resource.

The relationship between the first downlink subframe and the second downlink subframe, and the PDCCH information are specifically described in Embodiment 2, and are not further described here.

The network-side device may also include a processing unit 182, which is configured to configure at least two carriers for the UE, where the carriers include one primary carrier and at least one secondary carrier; select one of at least two timing relationships between the subframe carrying the PDSCH and a subframe carrying an ACK/NACK corresponding to the PDSCH, as a first timing relationship, where on a first carrier corresponding to the first timing relationship, a subframe of the same time as the second downlink subframe is a downlink subframe; determine a third uplink subframe corresponding to the first timing relationship and used for the UE to transmit the ACK/NACK corresponding to the PDSCH; determine the first carrier used for the UE to transmit the ACK/NACK corresponding to the PDSCH; and in the determined third uplink subframe of the first carrier, determine a first channel resource used for the UE to feed back the ACK/NACK corresponding to the PDSCH.

The primary carrier and secondary carrier are specifically described in Embodiment 2, and are not further described here.

The network-side device may include a receiving unit 183, which is configured to receive the ACK/NACK fed back by the UE on the first channel resource in the third subframe of the first carrier.

The processing unit may specifically include: a configuring unit, a timing relationship and subframe determining unit, a carrier determining unit, and a channel resource determining unit.

The configuring unit is configured to configure at least two carriers for the UE, where the carriers include one primary carrier and at least one secondary carrier, and output configured carrier information to the transmitting unit.

The timing relationship and subframe determining unit is configured to select one of at least two timing relationships between the subframe carrying the PDSCH and a subframe carrying an ACK/NACK corresponding to the PDSCH, as a first timing relationship, where the first timing relationship meets a first condition, and the first condition is that on a first carrier corresponding to the first timing relationship, a subframe of the same time as the second downlink subframe is a downlink subframe; and determine a third uplink subframe corresponding to the first timing relationship and used for the UE to transmit the ACK/NACK corresponding to the PDSCH.

The carrier determining unit is configured to determine a first carrier used for the UE to transmit the ACK/NACK corresponding to the PDSCH.

The channel resource determining unit is configured to: in the third uplink subframe determined by the timing relationship and subframe determining unit, and on the first carrier determined by the carrier determining unit, determine a first channel resource used for the UE to feed back the ACK/NACK corresponding to the PDSCH.

The timing relationship and subframe determining unit may be specifically configured to: if the timing relationships correspond to different carriers, select one of at least two timing relationships between the subframe carrying the PDSCH and a subframe carrying an ACK/NACK corresponding to the PDSCH, as a first timing relationship, where the first timing relationship meets the condition that on a first carrier corresponding to the first timing relationship, a subframe of the same time as the second downlink subframe is a downlink subframe and meets one of the following conditions: a timing relationship corresponding to a carrier that has the lightest ACK/NACK channel load among different carriers; a timing relationship corresponding to a carrier that has the shortest ACK/NACK feedback delay among different carriers; and a timing relationship corresponding to a carrier where transmit power needed by the UE is the lowest among different carriers; and/or, if the timing relationships correspond to a same carrier, select one of at least two timing relationships between the subframe carrying the PDSCH and a subframe carrying an ACK/NACK corresponding to the PDSCH, as a first timing relationship, where the first timing relationship meets the condition that on a first carrier corresponding to the first timing relationship, a subframe of the same time as the second downlink subframe is a downlink subframe and meets one of the following conditions: a timing relationship corresponding to an uplink subframe that has the lightest load in the same carrier; and a timing relationship corresponding to an uplink subframe that has the shortest ACK/NACK feedback delay in the same carrier; and determine a third uplink subframe corresponding to the first timing relationship and used for the UE to transmit the ACK/NACK corresponding to the PDSCH.

Correspondingly, the carrier determining unit may be configured to determine, according to the first timing relationship determined by the timing relationship and subframe determining unit, a first carrier used for the UE to transmit the ACK/NACK corresponding to the PDSCH.

Or, the carrier determining unit is configured to determine a first carrier used for the UE to transmit the ACK/NACK corresponding to the PDSCH. And specifically, the carrier determining unit may specifically select, if different timing relationships correspond to different carriers, a carrier that corresponds to a timing relationship meeting the first condition and meets one of the following conditions, as the first carrier: a carrier that has the lightest load is selected as the first carrier according to loads of ACK/NACK channels on different carriers; or a carrier that has the shortest feedback delay is selected as the first carrier according to the ACK/NACK feedback delays on the carriers; or a carrier where transmit power needed by the UE is the lowest among different carriers is selected as the first carrier.

Correspondingly, the timing relationship and subframe determining unit may be specifically configured to: if different timing relationships correspond to different carriers, determine a corresponding first timing relationship according to the first carrier determined by the carrier determining unit, and determine, according to the first timing relationship and the subframe carrying the PDSCH, a third uplink subframe used for the UE to transmit the ACK/NACK corresponding to the PDSCH.

The indicating, by the transmitting unit, the related information corresponding to the third uplink subframe and first carrier determined by the processing unit to the UE, may be specifically: indicating the selected first timing relationship as the related information to the UE; or if the timing relationships correspond to different carriers, the indicating may be specifically: indicating the information about the first carrier as the related information to the UE.

The effect of the solution of this embodiment is similar to the effect of the method embodiment corresponding to FIG. 16, and is not further described here.

Embodiment 7

Figure 13:
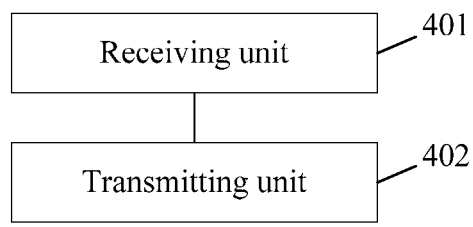
FIG. 13 is a schematic structural diagram of a user equipment according to Embodiment 7 of the present disclosure.

As shown in FIG. 13, this embodiment provides a user equipment UE, where the UE includes:

a receiving unit 401, configured to receive PDCCH information transmitted by a network-side device to the UE in a downlink subframe, where the PDCCH information indicates scheduling information of a PDSCH carried in a downlink subframe, where the receiving unit 401 is further configured to receive information about a first channel resource of which the network-side device notifies through signaling and which is used for the UE to feed back an ACK/NACK, where the first channel resource is determined by the network-side device from at least two different ACK/NACK channel resources that are determined by the network-side device according to at least two timing relationships between the PDSCH and the ACK/NACK corresponding to the PDSCH; and a transmitting unit 402, configured to feed back, on the first channel resource notified by the receiving unit 401, the ACK/NACK corresponding to the PDSCH to the network-side device.

The at least two timing relationships include at least timing relationships that correspond to different carriers and/or correspond to different uplink subframes on a same carrier.

The at least two different ACK/NACK channel resources include: ACK/NACK channel resources carried in uplink subframes of different carriers at the same time, and/or, ACK/NACK channel resources in different uplink subframes. Specifically, the ACK/NACK channel resources in different uplink subframes may be different uplink subframes on different carriers or different uplink subframes on a same carrier.

The receiving, by the receiving unit 401 in the UE, information about a first channel resource which is notified by the network-side device through signaling and is used for the UE to feed back an ACK/NACK, includes one of the following:

receiving, by the UE, a first channel resource that is used for the UE to feed back the ACK/NACK and of which the network-side device notifies through an added bit of the PDCCH information, a TPC, a DAI, a first scrambling code corresponding to the first channel resource, or a first PDCCH time-frequency resource position corresponding to the first channel resource.

The user equipment provided by this embodiment receives PDCCH information transmitted by the network-side device to the UE in a downlink subframe, where the PDCCH information indicates scheduling information of a PDSCH carried in a downlink subframe; receives information about a first channel resource of which the network-side device notifies through signaling and which is used for the UE to feed back an ACK/NACK, where the first channel resource is determined by the network-side device from at least two different ACK/NACK channel resources that are determined by the network-side device according to at least two timing relationships between the PDSCH and the ACK/NACK corresponding to the PDSCH; and feeds back, on the first channel resource, the ACK/NACK corresponding to the PDSCH to the network-side device, so that the ACK/NACK can also be fed back when carriers of different uplink and downlink subframe configurations are aggregated. In addition, the loads of ACKs/NACKs on carriers may be balanced, and the ACK/NACK feedback delay may be reduced.

Figure 19:
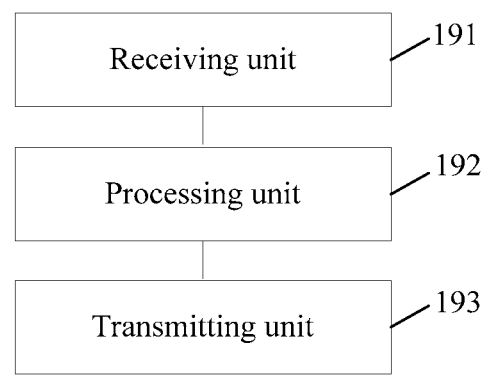
FIG. 19 is a schematic structural diagram of another user equipment according to Embodiment 7 of the present disclosure.

This embodiment further provides another user equipment, where the implementation solution of the user equipment is similar to the solution shown in FIG. 17. As shown in FIG. 19, the user equipment includes:

a receiving unit 191, a processing unit 192, and a transmitting unit 193, where:

the receiving unit 191 is configured to receive information about two carriers allocated by a network-side device for the user equipment UE, where the carriers include one primary carrier and at least one secondary carrier; receive PDCCH information transmitted by the network-side device to the UE in a first downlink subframe, where the PDCCH information indicates scheduling information of a PDSCH carried in a second downlink subframe; receive indication information transmitted by the network-side device, where a first timing relationship corresponding to the indication information meets a first condition: in a first carrier corresponding to the timing relationship, a subframe of the same time as the second downlink subframe is a downlink subframe; and receive information about a first channel resource allocated by the network-side device for the UE and used for feeding back an ACK/NACK corresponding to the PDSCH;

the processing unit 192 is configured to determine, according to the indication information received by the receiving unit, a third uplink subframe and a first carrier that are determined by the network-side device for the UE and used for ACK/NACK feedback; and determine, according to the information about the first channel resource received by the receiving unit, to transmit the ACK/NACK corresponding to the PDSCH on the first channel resource in the third uplink subframe of the first carrier; and the transmitting unit 193 is configured to transmit the ACK/NACK corresponding to the PDSCH on the first channel resource in the third uplink subframe of the first carrier.

If the indication information received by the receiving unit 191 is a first timing relationship selected by the network-side device, correspondingly the processing unit 192 is configured to determine, according to the first timing relationship and the second downlink subframe carrying the PDSCH, a third uplink subframe used for the UE to transmit the ACK/NACK corresponding to the PDSCH, and determine, according to the mapping relationships between timing relationships and carriers, the first carrier corresponding to the first timing relationship; and determine, according to the information about the first channel resource received by the receiving unit, to transmit the ACK/NACK corresponding to the PDSCH on the first channel resource in the third uplink subframe of the first carrier.

If the indication information received by the receiving unit 191 is information about the first carrier, correspondingly the processing unit 192 is configured to determine, according to mapping relationships between carriers and timing relationships, a first timing relationship corresponding to the first carrier, and determine, according to the first timing relationship and the second downlink subframe carrying the PDSCH, the corresponding third uplink subframe; and determine, according to the information about the first channel resource received by the receiving unit, to transmit the ACK/NACK corresponding to the PDSCH on the first channel resource in the third uplink subframe of the first carrier.

The effect of the solution of this embodiment is similar to the effect of the method embodiment corresponding to FIG. 17, and is not further described here.

Embodiment 8

Figure 14:
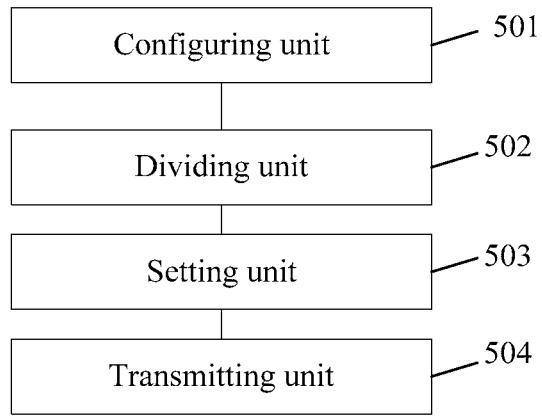
FIG. 14 is a schematic structural diagram of a network-side device according to Embodiment 8 of the present disclosure.

As shown in FIG. 14, this embodiment provides a network-side device, where the network-side device includes:

a configuring unit 501, configured to configure at least two carriers for a UE, where subframe n of at least two carriers among the configured carriers is an uplink subframe and needs to feed back an ACK/NACK;

a dividing unit 502, configured to divide downlink subframes corresponding to the ACK/NACK that subframe n needs to feed back, into at least two groups, where the number of downlink subframes in each group does not exceed $2^N-1$, where N indicates the number of bits of a DAI, where downlink subframes in at least one group belong to different carriers;

a setting unit 503, configured to set the DAI value in the PDCCH information corresponding to each downlink subframe in each group obtained by division by the dividing unit 502 to 1 to 2N−1 in turn; and a transmitting unit 504, configured to transmit the PDCCH information corresponding to the downlink subframes in each group, which is set by the setting unit 503, to the UE.

The dividing unit 502 is specifically configured to:

group downlink subframes whose transmission time is within the first $2^N-1$ subframes on the first carrier among the downlink subframes corresponding to the ACK/NACK, into a first group, where the $2^N-1$ downlink subframes are called a first group of subframes; and group other downlink subframes than the first group of subframes on the first carrier among the downlink subframes corresponding to the ACK/NACK, and downlink subframes on the second carrier among the downlink subframes corresponding to the ACK/NACK, into a second group, where the number of downlink subframes in the second group also does not exceed $2^N-1$.

The case of two carriers is described above; for three or more carriers, and/or three or more groups, the processing principle is similar, and therefore is not further described here.

The setting unit 503 is specifically configured to:

in each of the groups, set the DAI values from 1 to $2^N-1$ in turn according to the transmission time sequence of the PDCCH information, where the DAI values are set again according to the carrier sequence for at least two downlink subframes of the same transmission time. Of course, the setting of the DAI value may also use other manners, for example, use the setting sequence learnt by both the network-side device and the UE.

The network-side device provided by this embodiment avoids the ACK/NACK feedback information error by changing the DAI counting manner to avoid overlapping of the ACK/NACK feedback information.

Embodiment 9

Figure 15:
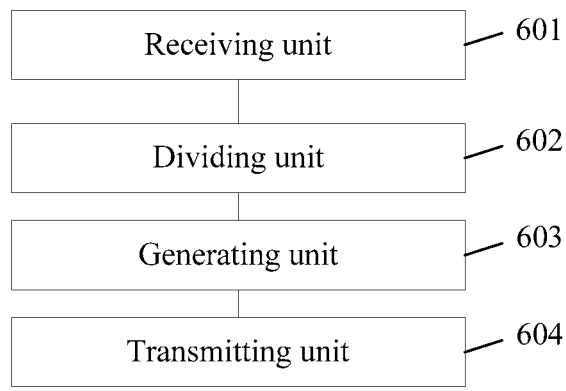
FIG. 15 is a schematic structural diagram of a user equipment according to Embodiment 9 of the present disclosure.

As shown in FIG. 15, this embodiment provides a user equipment UE, including:

a receiving unit 601, configured to receive at least two carriers configured by a network-side device, where subframe n of at least two carriers among the configured carriers is an uplink subframe and needs to feed back an ACK/NACK;

a dividing unit 602, configured to divide the downlink subframes that are received by the receiving unit 601 and correspond to the ACK/NACK that subframe n needs to feed back, into at least two groups, where the number of downlink subframes in each group does not exceed $2^N-1$, where N indicates the number of bits of a DAI, where downlink subframes in at least one group belong to different carriers; where the receiving unit 601 is further configured to receive PDCCH information transmitted by the network-side device in each downlink subframe in each group;

a generating unit 603, configured to: for each group that is obtained by division by the dividing unit 602, generate an N-bit ACK/NACK according to the DAI value in each piece of PDCCH information in the group and the ACK/NACK corresponding to the PDSCH indicated by the PDCCH information; and a transmitting unit 604, configured to transmit the ACK/NACK that is generated by the generating unit 603 and corresponds to each group to the network-side device.

The user equipment provided by this embodiment avoids the ACK/NACK feedback information error by changing the DAI counting mode to avoid overlapping of the ACK/NACK feedback information.

All or a part of the contents disclosed in the technical solutions according to the embodiments may be implemented by software programming. The programs may be stored in a computer readable storage medium, such as a hard disk, a CD-ROM, or a magnetic disk.

The foregoing descriptions are merely exemplary embodiments of the present disclosure, but are not intended to limit the present disclosure. Any modification, equivalent replacement, or improvement derived within the spirit and principle of the present disclosure shall fall within the protection scope of the present disclosure.

What is claimed is:

1. A method for receiving acknowledgement/negative acknowledgement (ACK/NACK) information, comprising:

determining, by a network-side device, one ACK/NACK feedback mode from multiple ACK/NACK feedback modes, wherein the multiple ACK/NACK feedback modes include a first ACK/NACK feedback mode and a second ACK/NACK feedback mode, the first ACK/NACK feedback mode indicates that ACK/NACK information can be fed back on a primary uplink component carrier or a secondary uplink component carrier, and the second ACK/NACK feedback mode indicates that ACK/NACK information can be fed back on a primary uplink component carrier and not fed back on a secondary uplink component carrier;

notifying, by the network-side device, the determined ACK/NACK feedback mode to a user equipment device through signaling; and receiving, by the network-side device, the ACK/NACK information from the user equipment device.

2. The method according to claim 1, wherein receiving, by the network-side device, the ACK/NACK information from the user equipment device comprises:

receiving, by the network-side device, the ACK/NACK information from the user equipment device through physical uplink control channel (PUCCH).

3. The method according to claim 1, wherein the notifying comprises:

notifying, by the network-side device, the determined ACK/NACK feedback mode to the user equipment device through radio resource control (RRC) dedicated signaling.

4. A method for transmitting acknowledgement/negative acknowledgement (ACK/NACK) information, comprising:

receiving, by a user equipment device, signaling from a network-side device;

determining, by the user equipment device, a ACK/NACK feedback mode according to the received signaling, wherein the ACK/NACK feedback mode is one of multiple ACK/NACK feedback modes, the multiple ACK/NACK feedback modes include a first ACK/NACK feedback mode and a second ACK/NACK feedback mode, the first ACK/NACK feedback mode indicates that ACK/NACK information can be fed back on a primary unlink component carrier or a secondary uplink component carrier, and the second ACK/NACK feedback mode indicates that ACK/NACK information can be fed back on a primary uplink component carrier and not fed back on a secondary uplink component carrier; and transmitting, by the user equipment device, the ACK/NACK information to the network-side device according to the determined ACK/NACK feedback mode.

5. The method according to claim 4, wherein the transmitting the ACK/NACK information comprises:

transmitting, by the user equipment device, the ACK/NACK information through physical uplink control channel (PUCCH) according to the determined ACK/NACK feedback mode.

6. The method according to claim 4, wherein the receiving comprises:

receiving, by the user equipment device, radio resource control (RRC) dedicated signaling from the network-side device.

7. The method according to claim 4, the transmitting the ACK/NACK information comprises:

transmitting, by the user equipment device, the ACK/NACK information according to the determined ACK/NACK feedback mode and a set ACK/NACK timing relationship.

8. A network-side device, comprising:
a processor, configured to determine one acknowledgement/negative acknowledgement (ACK/NACK) feedback mode from multiple ACK/NACK feedback modes, wherein the multiple ACK/NACK feedback modes include a first ACK/NACK feedback mode and a second ACK/NACK feedback mode, the first ACK/NACK feedback mode indicates that ACK/NACK information can be fed back on a primary uplink component carrier or a secondary uplink component carrier, and the second ACK/NACK feedback mode indicates that ACK/NACK information can be fed back on a primary uplink component carrier and not fed back on a secondary uplink component carrier; and
a transceiver, configured to notify the determined ACK/NACK feedback mode to a user equipment device through signaling, and receive the ACK/NACK information from the user equipment device.

9. The network-side device according to claim 8, wherein the transceiver is configured to receive the ACK/NACK information from the user equipment device through physical uplink control channel (PUCCH).

10. The network-side device according to claim 8, wherein the transceiver is configured to notify the determined ACK/NACK feedback mode to the user equipment device through radio resource control (RRC) dedicated signaling.

11. A user equipment device, comprising:
a transceiver, configured to receive signaling from a network-side device; and
a processor, configured to determine an acknowledgement/negative acknowledgement (ACK/NACK) feedback mode according to the received signaling, wherein the ACK/NACK feedback mode is one of multiple ACK/NACK feedback modes, the multiple ACK/NACK feedback modes include a first ACK/NACK feedback mode and a second ACK/NACK feedback mode, the first ACK/NACK feedback mode indicates that ACK/NACK information can be fed back on a primary unlink component carrier or a secondary uplink component carrier, the second ACK/NACK feedback mode indicates that ACK/NACK information can be fed back on a primary uplink component carrier and not fed back on a secondary uplink component carrier;
wherein the transceiver is further configured to transmit ACK/NACK information to the network-side device according to the determined ACK/NACK feedback mode.

12. The user equipment device according to claim 11, wherein the transceiver is configured to transmit the ACK/NACK information through physical uplink control channel (PUCCH) according to the determined ACK/NACK feedback mode.

13. The user equipment device according to claim 11, wherein the transceiver is configured to receive radio resource control (RRC) dedicated signaling from the network-side device.

14. The user equipment device according to claim 11, wherein the transceiver is configured to transmit the ACK/NACK information according to the determined ACK/NACK feedback mode and a set ACK/NACK timing relationship.

* * * * *

UNITED STATES PATENT AND TRADEMARK OFFICE
CERTIFICATE OF CORRECTION

PATENT NO. : 10,225,062 B2
APPLICATION NO. : 15/392621
DATED : March 5, 2019
INVENTOR(S) : Guan et al.

Page 1 of 1

It is certified that error appears in the above-identified patent and that said Letters Patent is hereby corrected as shown below:

In the Claims

Claim 4, Column 52, Line 46 "primary unlink component" should read:
-- primary uplink component --.

Claim 11, Column 54, Line 10 ""primary unlink component" should read:
-- primary uplink component --.

Signed and Sealed this
Seventh Day of January, 2020

Andrei Iancu
*Director of the United States Patent and Trademark Office*